US010412769B2

(12) United States Patent
Cherian et al.

(10) Patent No.: US 10,412,769 B2
(45) Date of Patent: Sep. 10, 2019

(54) METHODS AND SYSTEMS FOR CROSS BSS SOUNDING

(71) Applicant: QUALCOMM Incorporated, San Diego, CA (US)

(72) Inventors: George Cherian, San Diego, CA (US); Simone Merlin, San Diego, CA (US); Alfred Asterjadhi, San Diego, CA (US); Yan Zhou, San Diego, CA (US); Abhishek Pramod Patil, San Diego, CA (US); Venkata Ramanan Venkatachalam Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/842,781

(22) Filed: Dec. 14, 2017

(65) Prior Publication Data
US 2018/0206274 A1    Jul. 19, 2018

Related U.S. Application Data

(60) Provisional application No. 62/447,272, filed on Jan. 17, 2017.

(51) Int. Cl.
*H04W 74/08* (2009.01)
*H04B 7/06* (2006.01)
(Continued)

(52) U.S. Cl.
CPC ........ *H04W 74/0858* (2013.01); *H04B 7/024* (2013.01); *H04B 7/0617* (2013.01);
(Continued)

(58) Field of Classification Search
CPC ... H04W 60/00; H04W 84/12; H04W 72/046; H04W 88/02; H04W 88/08;
(Continued)

(56) References Cited

U.S. PATENT DOCUMENTS 9,571,249 B2 *  2/2017  Bhanage ............... H04L 5/0048
9,634,745 B2 *  4/2017  Patwardhan ......... H04B 7/0452
(Continued)

OTHER PUBLICATIONS

International Search Report and Written Opinion—PCT/US2018/012794—ISA/EPO—dated Apr. 5, 2018.

*Primary Examiner* — Man U Phan
(74) *Attorney, Agent, or Firm* — Steven R. Thiel; Paradice and Li LLP

(57) ABSTRACT

Methods and systems for sounding a wireless network are disclosed. In one aspect, a method includes receiving, by an access point a message including a beamforming report from a device. The device may be a station that is outside a basic service set of the access point. The method also includes transmitting a message to the device based on the beamforming report. For example, in some aspects, the access point may utilize the beamforming report to perform a coordinated beamforming, multi-access point transmission or a multi-access point MIMO transmission. In some aspects, the access point may transmit an interference nulling signal to the device based on the beamforming report. The nulling signal compensates for another simultaneous transmission by the access point that interferes with the device's reception of a message from an access point with which the device is associated.

28 Claims, 13 Drawing Sheets

(51) Int. Cl.
    *H04L 25/02*     (2006.01)
    *H04B 7/024*     (2017.01)
    *H04B 7/0413*     (2017.01)
    *H04W 88/02*     (2009.01)
    *H04W 88/08*     (2009.01)
    *H04W 72/04*     (2009.01)

(52) U.S. Cl.
    CPC ....... *H04B 7/0626* (2013.01); *H04L 25/0224* (2013.01); *H04B 7/0413* (2013.01); *H04W 72/046* (2013.01); *H04W 88/02* (2013.01); *H04W 88/08* (2013.01)

(58) Field of Classification Search
    CPC . H04W 74/0858; H04W 74/08; H04W 72/04; H04L 25/0224; H04B 7/024; H04B 7/0626; H04B 7/0617; H04B 7/0413; H04B 7/06

USPC ........................................................ 370/329
See application file for complete search history.

(56) References Cited

U.S. PATENT DOCUMENTS

| | | | | |
|---|---|---|---|---|
| 9,750,038 B2 * | 8/2017 | Ghosh | .................... | H04W 24/10 |
| 9,788,317 B2 * | 10/2017 | Ghosh | ............... | H04W 72/0446 |
| 9,825,684 B2 * | 11/2017 | Patwardhan | ......... | H04B 7/0452 |
| 9,936,488 B2 | 4/2018 | Seok et al. | | |
| 10,027,512 B2 * | 7/2018 | Seok | .................... | H04B 7/0634 |
| 10,044,427 B2 * | 8/2018 | Patwardhan | .......... | H04B 7/0452 |
| 10,070,449 B2 * | 9/2018 | Ghosh | .................... | H04W 24/10 |
| 10,136,262 B2 * | 11/2018 | Bhanage | ............... | H04W 4/029 |
| 2013/0094488 A1 * | 4/2013 | Choi | .................... | H04W 16/28 |
| | | | | 370/338 |
| 2015/0312877 A1 | 10/2015 | Bhanage | | |
| 2016/0295581 A1 | 10/2016 | Ghosh et al. | | |

* cited by examiner

METHODS AND SYSTEMS FOR CROSS BSS SOUNDING

CROSS REFERENCE TO RELATED APPLICATION(S)

This application claims the benefit of U.S. Provisional Application No. 62/447,272 titled "METHODS AND SYSTEMS FOR CROSS BSS SOUNDING," filed Jan. 17, 2017. The content of this prior application is considered part of this application and is hereby incorporated by reference in its entirety.

TECHNICAL FIELD

Certain aspects of the present disclosure generally relate to transmissions over a wireless medium utilizing multiple access points. In particular, the present disclosure describes methods and systems describe multi-user transmissions that may be performed by multiple access points simultaneously.

BACKGROUND

Many wireless networks utilize carrier-sense multiple access with collision detection (CSMA/CD) to share a wireless medium. With CSMA/CD, before transmission of data on the wireless medium, a device may listen to the medium to determine whether another transmission is in progress. If the medium is idle, the device may attempt a transmission. The device may also listen to the medium during its transmission, so as to detect whether the data was successfully transmitted, or if perhaps a collision with a transmission of another device occurred. When a collision is detected, the device may wait for a period of time and then re-attempt the transmission. The use of CSMA/CD allows for a single device to utilize a particular channel (such as a spatial or frequency division multiplexing channel) of a wireless network.

Users continue to demand greater and greater capacity from their wireless networks. For example, video streaming over wireless networks is becoming more common. Video teleconferencing may also place additional capacity demands on wireless networks. In order to satisfy the bandwidth and capacity requirements users require, improvements in the ability of a wireless medium to carry larger and larger amounts of data are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect is a method of sounding a wireless network. The method includes receiving, by an access point with a basic service set (BSS), a first message including a beamforming report from a device unassociated with the access point; and transmitting, by the access point, a message to the device based on the beamforming report.

Another aspect is an apparatus for sounding a wireless network. The apparatus includes an electronic hardware processor, an electronic hardware memory storing instructions that when executed cause the electronic hardware processor to receive, by an access point with a basic service set (BSS), a first message including a beamforming report from a device unassociated with the access point; and transmit, by the access point, a message to the device based on the beamforming report.

Another aspect includes a non-transitory computer readable medium comprising instructions that when executed cause an electronic hardware processor to perform a method of sounding a wireless network, the method comprising receiving, by an access point with a basic service set (BSS), a first message including a beamforming report from a device unassociated with the access point; and transmitting, by the access point, a message to the device based on the beamforming report.

Another aspect includes a method of sounding a wireless network. The method includes receiving, by a station, a sounding message from a first access point, wherein the station is associated with a second access point different than the first access point, generating, by the station, a beamforming report based on the sounding message, transmitting, by the station, the beamforming report over the wireless network.

Another aspect includes an apparatus for sounding a wireless network. The apparatus includes an electronic hardware processor, an electronic hardware memory storing instructions that when executed cause the electronic hardware processor to receive, by a station, a sounding message from a first access point, wherein the station is associated with a second access point different than the first access point, generate, by the station, a beamforming report based on the sounding message, and transmit, by the station, the beamforming report over the wireless network.

Another aspect disclosed is a non-transitory computer readable medium comprising instructions that when executed cause an electronic hardware processor to perform a method of sounding a wireless network. The method includes receiving, by a station, a sounding message from a first access point, wherein the station is associated with a second access point different than the first access point, generating, by the station, a beamforming report based on the sounding message, transmitting, by the station, the beamforming report over the wireless network.

Another aspect disclosed is a method of sounding a wireless network. The method includes receiving, by a first access point, a first message including a beamforming report for a first station associated with the first access point, decoding the beamforming report to determine first station sounding information for a second access point; and transmitting the sounding information to the second access point.

Another aspect disclosed is an apparatus for sounding a wireless network. The apparatus includes an electronic hardware processor, an electronic hardware memory, operably connected to the electronic hardware processor, and storing instructions that when executed by the electronic hardware processor, cause the electronic hardware processor to receive, by a first access point, a first message including a beamforming report for a first station associated with the first access point, decode the beamforming report to determine first station sounding information for a second access point; and transmit the sounding information to the second access point.

Another aspect disclosed is a non-transitory computer readable storage medium comprising instructions that when executed cause an electronic hardware processor to perform a method of sounding a wireless network. The method includes receiving, by a first access point, a first message including a beamforming report for a first station associated with the first access point, decoding the beamforming report to determine first station sounding information for a second access point; and transmitting the sounding information to the second access point.

Another aspect disclosed is a method of sounding a wireless network, comprising receiving, by an access point having a basic service set, a sounding frame from a station outside the basic service set, generating a beamforming report for the station based on the sounding frame, transmitting the beamforming report to a second access point.

Another aspect disclosed is an apparatus for sounding a wireless network. The apparatus includes an electronic hardware processor, an electronic hardware memory, operably connected to the electronic hardware processor, and storing instructions that when executed by the electronic hardware processor, cause the electronic hardware processor to receive, by an access point having a basic service set, a sounding frame from a station outside the basic service set, generate a beamforming report for the station based on the sounding frame, transmit the beamforming report to a second access point.

Another aspect disclosed is a non-transitory computer readable storage medium comprising instructions that when executed cause an electronic hardware processor to perform a method of sounding a wireless network. The method includes receiving, by an access point having a basic service set, a sounding frame from a station outside the basic service set, generating a beamforming report for the station based on the sounding frame, transmitting the beamforming report to a second access point.

DETAILED DESCRIPTION

Figure 1:
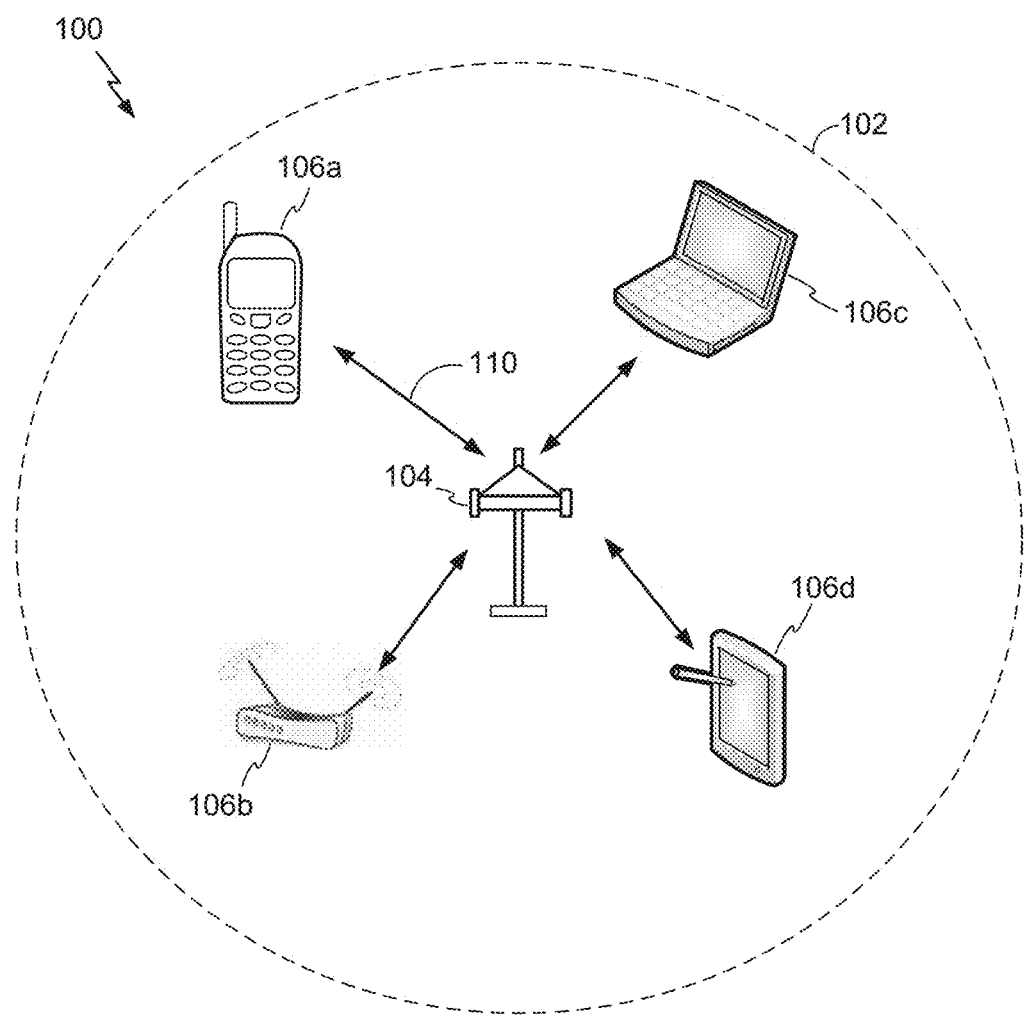
FIG. 1 is a diagram that illustrates a multiple-access multiple-input multiple-output (MIMO) system 100 with APs and STAs.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently or combined with any other aspect of the disclosure. In addition, the scope is intended to cover such an apparatus or method which is practiced using other structure and functionality as set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown, but is to be accorded with the widest scope consistent with the principles and features disclosed herein.

Wireless access network technologies may include various types of wireless local area access networks (WLANs). A WLAN may be used to interconnect nearby devices together, employing widely used access networking protocols. The various aspects described herein may apply to any communication standard, such as Wi-Fi or, more generally, any member of the IEEE 802.11 family of wireless protocols.

In some implementations, a WLAN includes various devices which access the wireless access network. For example, there may be: access points ("APs") and clients (also referred to as stations, or "STAs"). In general, an AP serves as a hub or a base station for the STAs in the WLAN. A STA may be a laptop computer, a personal digital assistant (PDA), a mobile phone, etc. In an example, an STA connects to (e.g., "communicates with") an AP via a Wi-Fi (e.g., IEEE 802.11 protocol such as 802.11ah) compliant wireless link to obtain general connectivity to the Internet or to other wide area access networks. In some implementations an STA may also be used as an AP.

An access point ("AP") may comprise, be implemented as, or known as a NodeB, Radio Access network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, a user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, a Node-B (Base-station), or any other suitable device that is configured to communicate via a wireless medium.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). The cdma2000 is described in documents from an organization named "3rd Generation Partnership Project 2" (3GPP2). These various radio technologies and standards are known in the art.

FIG. 1 is a diagram that illustrates a multiple-access multiple-input multiple-output (MIMO) system 100 with APs and STAs. For simplicity, only one AP 104 is shown in FIG. 1. As described above, the AP 104 communicates with the STAs 106a-d (also referred to herein collectively as "the STAs 106" or individually as "the STA 106") and may also be referred to as a base station or using some other terminology. Also as described above, a STA 106 may be fixed or mobile and may also be referred to as a user terminal, a mobile station, a wireless device, or using some other terminology. The AP 104 may communicate with one or more STAs 106 at any given moment on the downlink or uplink. The downlink (i.e., forward link) is the communication link from the AP 104 to the STAs 106, and the uplink (i.e., reverse link) is the communication link from the STAs 106 to the AP 104. A STA 106 may also communicate peer-to-peer with another STA 106.

Portions of the following disclosure will describe STAs 106 capable of communicating via Spatial Division Multiple Access (SDMA). Thus, for such aspects, the AP 104 may be configured to communicate with both SDMA and non-SDMA STAs. This approach may conveniently allow older versions of STAs (e.g., "legacy" STAs) that do not support SDMA to remain deployed in an enterprise, extending their useful lifetime, while allowing newer SDMA STAs to be introduced as deemed appropriate.

The system 100 may employ multiple transmit and multiple receive antennas for data transmission on the downlink and uplink. The AP 104 is equipped with Nap antennas and represents the multiple-input (MI) for downlink transmissions and the multiple-output (MO) for uplink transmissions. A set of K selected STAs 106 collectively represents the multiple-output for downlink transmissions and the multiple-input for uplink transmissions. For pure SDMA, it is desired to have Nap≤K≤1 if the data symbol streams for the K STAs are not multiplexed in code, frequency or time by some means. K may be greater than Nap if the data symbol streams can be multiplexed using TDMA technique, different code channels with CDMA, disjoint sets of subbands with OFDM, and so on. Each selected STA may transmit user-specific data to and/or receive user-specific data from the AP. In general, each selected STA may be equipped with one or multiple antennas (i.e., Nut 1). The K selected STAs can have the same number of antennas, or one or more STAs may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each STA may be equipped with a single antenna (e.g., in order to keep costs down) or multiple antennas (e.g., where the additional cost can be supported). The system 100 may also be a TDMA system if the STAs 106 share the same frequency channel by dividing transmission/reception into different time slots, where each time slot may be assigned to a different STA 106.

Figure 2:
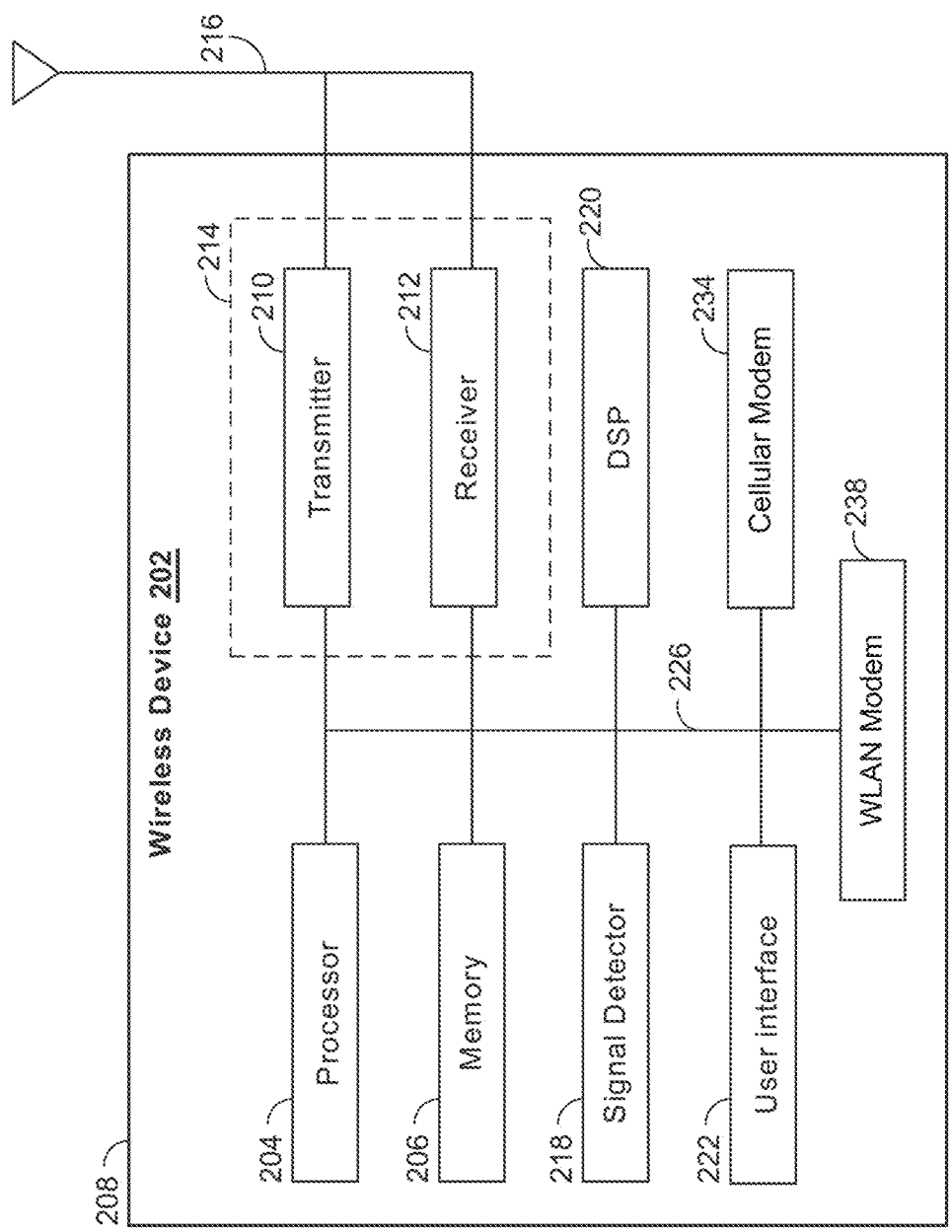
FIG. 2 illustrates various components that may be utilized in a wireless device 202 that may be employed within the wireless communication system 100.

FIG. 2 illustrates various components that may be utilized in a wireless device 202 that may be employed within the wireless communication system 100. The wireless device 202 is an example of a device that may be configured to implement the various methods described herein. The wireless device 202 may implement an AP 104 or a STA 106.

The wireless device 202 may include an electronic hardware processor 204 which controls operation of the wireless device 202. The processor 204 may also be referred to as a central processing unit (CPU). Electronic hardware memory 206, which may include both read-only memory (ROM) and random access memory (RAM), provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more electronic hardware processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transceiver antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. In some aspects, the wireless device may also include one or more of a user interface component 222, cellular modem 234, and a wireless lan (WLAN) modem. The cellular modem may provide for communication using cellular technologies, such as CDMA, GPRS, GSM, UTMS, or other cellular networking technology. The WLAN modem 238 may provide for communications using one or more WiFi technologies, such as any of the IEEE 802.11 protocol standards.

The various components of the wireless device 202 may be coupled together by a bus system 222, which may include a power bus, a control signal bus, and a status signal bus in addition to a data bus.

Certain aspects of the present disclosure support transmitting an uplink (UL) signal or a downlink (DL) signal between one or more STAs and an AP. In some embodiments, the signals may be transmitted in a multi-user MIMO (MU-MIMO) system. Alternatively, the signals may be transmitted in a multi-user 1-DMA (MU-FDMA) or similar 1-DMA system. In some aspects, these signals may be transmitted over one or more of the transmitter 210 and the WiFi Modem 238.

Figure 3:
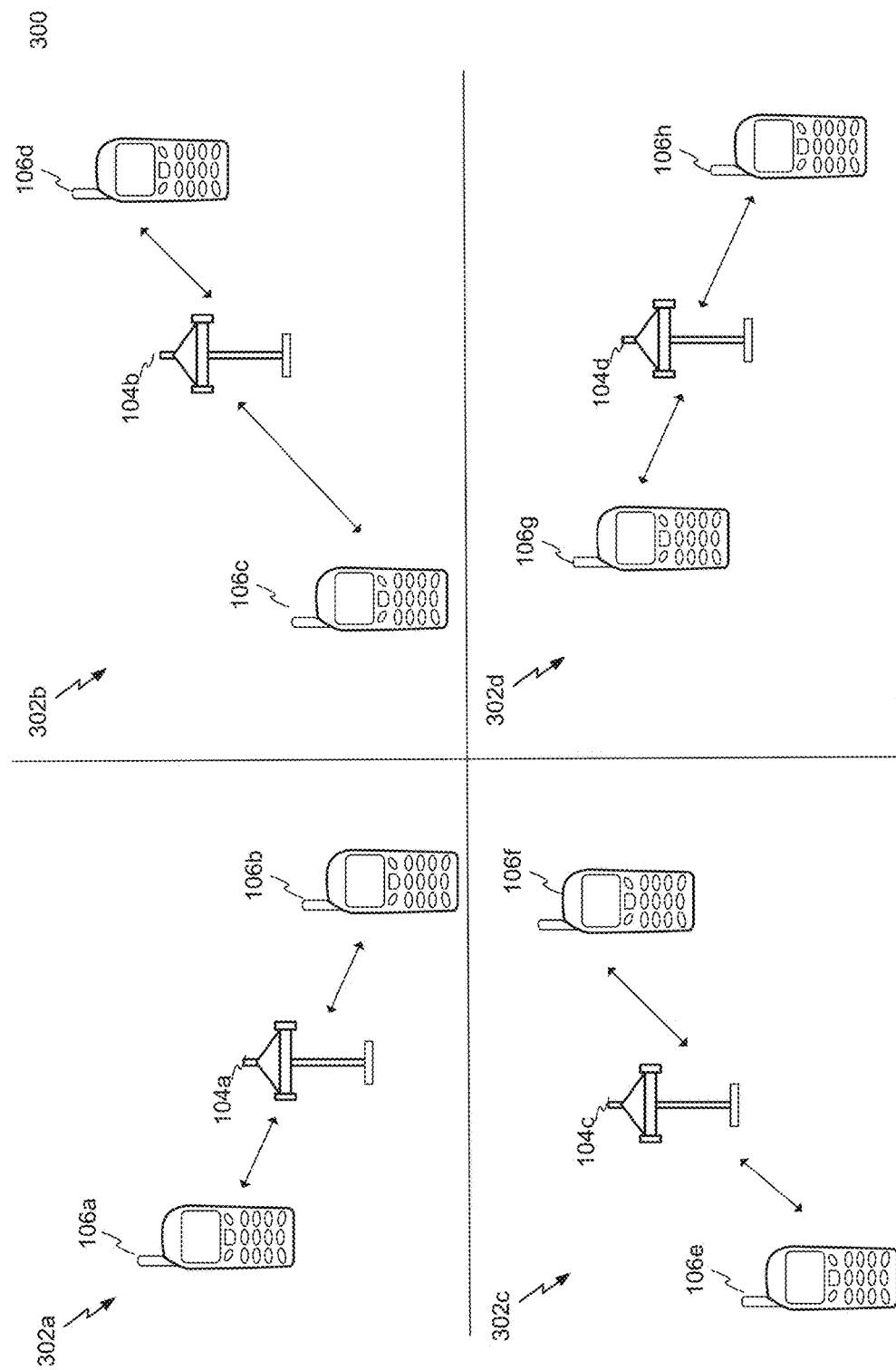
FIG. 3 shows four basic service sets (BSSs), each BSS including an access point.

FIG. 3 shows four basic service sets (BSSs) 302*a-d*, each BSS including an access point 104*a-d* respectively. Each access point 104*a-d* is associated with at least two stations within its respective BSS 302*a-d*. AP 104*a* is associated with STA 106*a-b*. AP 104*b* is associated with STA 106*c-d*. AP 104*c* is associated with STA 106*e-f*. AP 104*d* is associated with STAs 106*g-h*. An AP that is associated with a STA may be referred to as a BSS AP for the STA throughout this disclosure. Similarly, an AP for which there is no association with a particular STA may be referred to as an OBSS AP for the STA throughout this disclosure. Associations between an AP and one or more stations provides for, in part, coordination of communication between devices within the basic service set (BSS) defined by the AP and its associated STAs. For example, devices within each BSS may exchange signals with each other. The signals may function to coordinate transmissions from the respective AP 104*a-d* and stations within the AP's BSS 302*a-d*. As one having ordinary skill in the art will appreciate, a client device (e.g., a STA) may "associate" with a BSS belonging to an AP. As one having ordinary skill in the art will further appreciate, a STA may "connect" to, or "communicate" with, another device (e.g., the AP) in any number of ways (e.g., by sending a message to the AP, by receiving a message from the AP, etc.), without formally "associating" with the AP, as it may be described in one or more standards (e.g., 802.11).

The devices shown in FIG. 3, including the AP's 104*a-d* and STA 106*a-h*, also share a wireless medium. Sharing of the wireless medium is facilitated, in some aspects, via the use of carrier sense media access with collision detection (CSMA/CD). The disclosed embodiments may provide for a modified version of CSMA/CD that provides for an increase in an ability for the BSSs 302*a-d* to communicate simultaneously when compared to known systems.

The stations 106*a-h* within the BSSs 302*a-d* may have different abilities to receive transmissions from their associated AP based, at least in part, on their position relative to the other APs and/or stations outside their respective BSS (OBSS). For example, because the stations 106*a*, 106*d*, 106*e*, and 106*h* are positioned relatively far from OBSS APs, these stations may have an ability to receive transmissions from their BSS AP even with an OBSS AP or STA is transmitting. Stations having such receive characteristics may be referred to as Reuse STAs throughout this disclosure.

In contrast, STAs 106*b*, 106*c*, 106*f*, and 106*g* are illustrated in positions that are relatively close to an OBSS AP. Thus, these stations may have less ability to receive transmissions from their BSS AP during transmissions from OBSS AP's and/or OBSS STAs. Stations having such receive characteristics may be referred to as non-reuse or edge STAs throughout this disclosure. In some aspects, the disclosed methods and systems may provide for an improved ability for the non-reuse STAs to communicate concurrently while other OBSS devices are also communicating on the wireless medium.

In at least some of the disclosed aspects, two or more of the APs 104*a-d* may negotiate to form a cluster of access points. In other aspects, cluster configurations may be defined via manual configuration. For example, each AP may maintain configuration parameters indicating whether the AP is part of one or more clusters, and if so, such APs may also maintain a cluster identifier for the cluster. In some aspects, a cluster configuration may also indicate whether the AP is a cluster controller for the cluster. In some of the embodiment disclosed herein, a cluster controller may perform different functions than APs that are part of the cluster but are not a cluster controller. Thus, in some aspects, two or more of the APs 104a-d may be included in the same cluster. STAs associated with APs included in a cluster may also be considered to be included in the cluster of their associated AP. Therefore, because in some aspects two or more of the APs 104a-d may be included in the same cluster, in some aspects, the STAs a-h may also be included in the same cluster.

Thus, in accordance with the features described above, two or more APs may gather information about their neighborhood (e.g., the network, channel conditions, BSSs, traffic pattern, etc.) and coordinate to form a cluster. As described above, the cluster may further include one, more, or all of the STAs in connection and/or in association with the APs. In some aspects, an external entity (e.g., a controller or "cluster controller") may facilitate forming the cluster. In some embodiments, one of the APs may function as a cluster controller.

In some aspects, APs in a cluster may be configured to account for certain security concerns among the cluster. For example, APs 104a-d may all be physically located at a particular venue or location. example, APs 104a-c may all be members of a first operator (e.g., a first mobile network operator, such as T-Mobile) and AP 104D may be a member of a second operator (e.g., a second mobile network operator, such as Verizon). In some aspects, an AP may determine whether to protect (e.g., via encryption) one or more communications between APs belonging to the first operator and APs belonging to the second operator. In accordance with the determination and the features described herein, the APs 104a-d may thus form a cluster, despite all of the APs of the cluster not being members of the same operator.

In some aspects, APs in a cluster may coordinate transmissions between themselves and their associated APs and/or STAs. In some aspects, a cluster identifier may uniquely identify the group of access points in the cluster. In some aspects, during association of a station with any of the APs in a cluster, the cluster identifier may be transmitted to the station, for example, in a frame. In an aspect, the frame may be a management frame, for example, an association response frame, a probe response frame, a beacon frame, etc. The station may then utilize the cluster identifier to coordinate communications within the cluster. For example, one or more messages transmitted over the wireless network may include the cluster identifier, which a receiving STA may use to determine whether the message is addressed to the STA or is not addressed to the STA.

In another aspect, a list of the APs in the cluster may be provided to the station during association. The list of the APs may identify the APs according to media access control (MAC) address. The station may receive the list over the wireless network, for example, via an advertisement in a beacon from an AP or APs, in a different type of management frame (e.g., a probe response frame or an association response frame), etc. The station may then utilize the list of APs to coordinate communications within the cluster. As other non-limiting examples, the STAs may utilize the list of APs to: identify OBSS APs that belong to the cluster, determine which frames (if any) from OBSS APs to decode, determine which frames (if any) from OBSS APs to discard, or some combination thereto.

In some implementations, an AP may assign a unique cluster-STA-identifier to a STA when the STA associates with the AP. Such a cluster-STA identifier may be unique to each STA belonging to a cluster. In an aspect, each AP may share and coordinate the cluster-STA identifiers so that no two STAs in the cluster have the same cluster-STA identifier. In this case, an OBSS AP may address an unassociated station (e.g., a station that is not associated with the OBSS AP) according to the cluster-STA identifier assigned to the unassociated station. It should be understood that such features may be incorporated in any number of combinations. As some non-limiting examples, a frame may include: a cluster-STA identifier as well as a cluster-ID, a cluster-STA identifier and not a cluster-ID, a cluster-ID and not a cluster-STA identifier, etc. In the instance where the frame includes both a cluster-STA identifier and a cluster-ID, in one example, a STA that receives the frame may thus be informed that the frame is from an OBSS AP and that the frame relates to a distributed (e.g., or "joint) MIMO communication.

In other implementations, one or more APs in the cluster may share the MAC addresses for their respective associated STAs. For example, the AP 104a may be part of a cluster further including APs 104b-d. The AP 104a may be associated with stations 106a and 106b. In this example, the APs 104b-d are unassociated (or "not associated") with the station 106a or the station 106b (e.g., from the perspective of station 106a and station 106b, APs 104b-d are "OBSS APs"). In this example, the AP 104a may thus share, among the cluster, identifiers for the station 106a and the station 106b. For example, the identifiers may comprise a cluster-STA identifier for each of the stations 106a and 106b. The cluster-STA identifier for the station 106a and 106b may comprise the MAC address of station 106a and 106b, respectively. In response to the AP 104a sharing such identifiers, the APs 104b-d (the OBSS APs, in this example) may be enabled to send directed frames to one or both of stations 106a and 106b.

In some embodiments, the above-described list of APs may be utilized (e.g., for identifying the cluster) instead of the above described cluster identifier. In some embodiments, the above-described cluster identifier may be utilized (e.g., for identifying the cluster) instead of the above-described list of APs. In some embodiments, both of, or neither of, the list of the APs and the cluster identifier may be utilized, for example, for identifying the cluster. Thus, different or alternative schemes described herein may utilized for identifying the cluster.

In any case, via utilization of one or more of such cluster identifications (e.g., a cluster identifier, a list of APs, distribution of one or more cluster-STA identifiers), a non-AP STA (e.g., the STA 106a) may decode and respond to particular frames sent by OBSS APs (e.g., the AP 104d) belonging to the cluster. Furthermore, the STA 106a may be configured to discard (e.g., ignore) frames from APs that do not belong to the cluster.

Embodiments that cluster of access points may also utilize various methods to identify STAs within the cluster. For example, as known methods of generating association identifiers (AIDs) may not provide uniqueness across access points, in some aspects, media access control (MAC) addresses may be utilized to identify stations where appropriate. For example, known messages including user info fields that utilize association identifiers to identify stations may be modified to contain data derived from station MAC addresses in the disclosed embodiments. Alternatively, methods of generating association identifiers may be modified to ensure uniqueness within a cluster of access points. For example, a portion of the association identifier may uniquely identify an access point within the cluster. Stations associated with that access point would be assigned association identifiers including the unique identification. This provides unique association identifiers across access points within a cluster. In some other aspects, an association identifier within a cluster may include the cluster identifier. This may provide for uniqueness across clusters to facilitate future cross-cluster coordination of communication.

Figure 4:
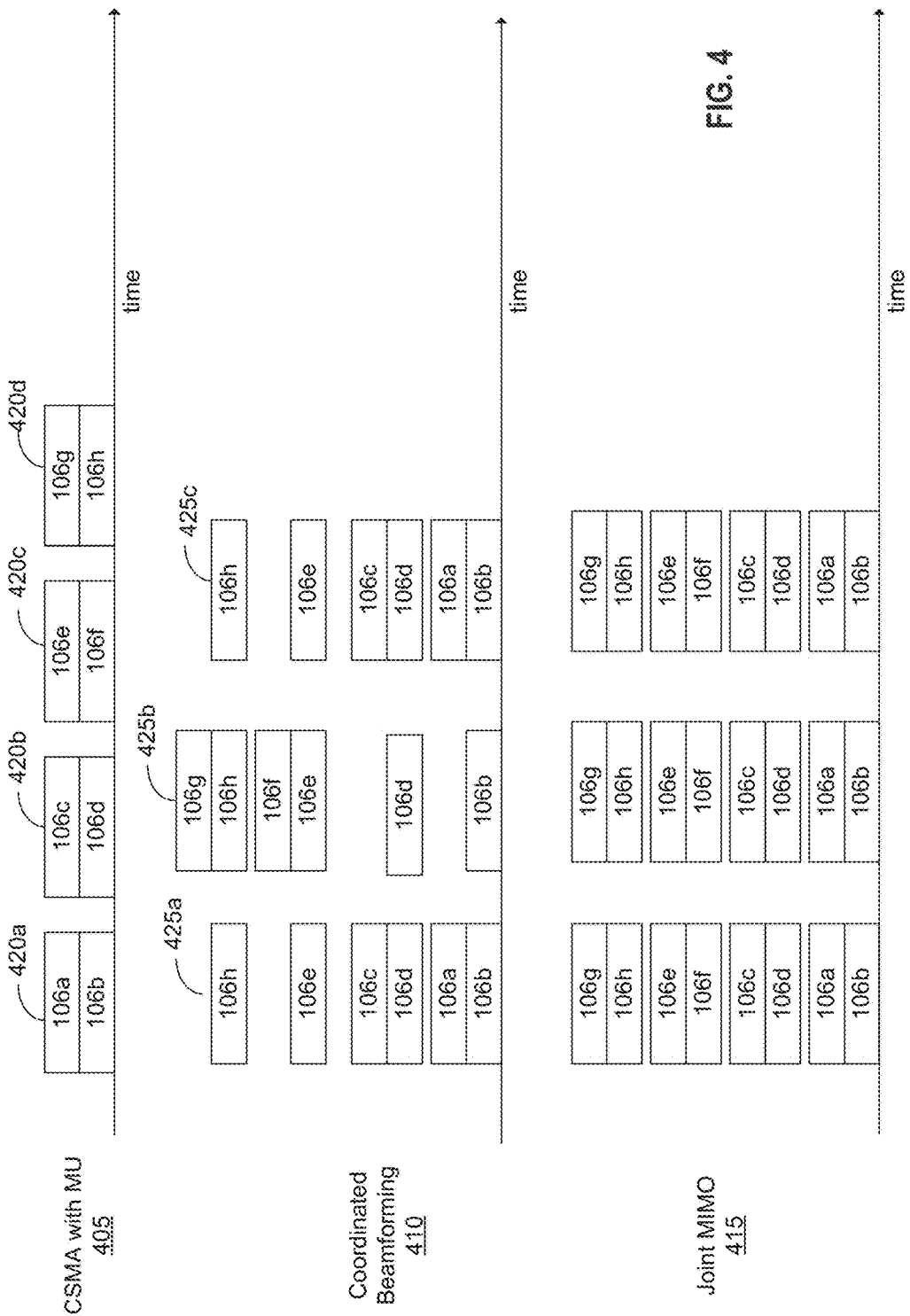
FIG. 4 shows three exemplary approaches to arbitrating the wireless medium with the communications system 300 of FIG. 3.

FIG. 4 shows three exemplary approaches to arbitrating the wireless medium with the communications system 300 of FIG. 3. Approach 405 utilizes carrier sense media access (CSMA) to perform single BSS multi-user transmissions. For example, each of transmissions 420a-d may be performed by the BSSs 302a-d of FIG. 3 respectively. The use of traditional CSMA in approach 405 causes the medium to be utilized by only one BSS at any point in time.

Medium arbitration approach 410 utilizes coordinated beamforming. With coordinated beamforming 410, the APs 104a-d may coordinate transmissions between their respective BSSs. In some aspects, this coordination may be performed over the wireless medium, or in some aspects, over a back-hail network. In these aspects, the coordination traffic over the backhaul network provided for improved utilization of the wireless medium.

With this approach, reuse STAs for different BSSs may be scheduled to transmit or receive data concurrently. For example, a relative strength of a communication channel between STA 106a and AP 104a may allow these two devices to exchange data simultaneously with communication with OBSS devices, such as, for example, AP 104b and STA 106d. In addition, approach 410 provides for non-reuse STAs may be scheduled to transmit concurrently with OBSS devices. For example, STA 106b, which is within BSS 302, may be scheduled to communicate simultaneous with communication between AP 104d and STA 106h of BSS 302d. Such simultaneous communication between a non-reuse STA (such as STA 106b) and, for example, AP 104d may be facilitated by scheduling AP 104d to transmit a signal to STA 106b simultaneous with AP 104d's transmission to STA 106h. For example, AP 104d may transmit a null signal for dominant interfering signals to STA 106b. Thus, while transmitting a first signal to STA 106h, AP 104d may simultaneously transmit a signal nulling the first signal to STA 106b. Such simultaneous transmission by the AP 104d may be provided by selecting individual antenna(s) of a plurality of antennas provided by AP 104d for each of the transmissions.

Arbitration approach 415 shows an exemplary joint multi-user communication or distributed MIMO communication across access points 104a-d within the BSSs 302a-d. With this approach, a cluster of APs (such as APs 104a-d) may service N 1-SS STAs simultaneously, where N is ~¾ of a total number of antennas across all APs within the cluster. Distributed MIMO communications may coordinate a collection of antennas across the multiple APs within a cluster to transmit to stations within the cluster. Thus, while traditional MIMO methods allocate transmit antennas within a single BSS to stations within the BSS, distributed MIMO provides for allocation of transmit antennas outside a BSS to facilitate communications with stations within the BSS.

In a distributed MIMO communication, a station in one BSS may communicate with one or more access points in another, different BSS. Thus, for example, station 106a of BSS 302a of FIG. 3 may communication with access point 104d, which is in BSS 302d. This communication may occur simultaneously with communication between STA 106a and AP 104a, the BSS AP of the STA 106a. In some aspects of an uplink distributed MIMO communication, the STA 106a may conduct one or more uplink communications to AP 104a simultaneously with AP 104d. Alternatively, a downlink distributed MIMO communication may include AP 104a transmitting data to STA 106a simultaneously with a transmission from AP 104d to STA 106a.

Thus, one or more of the distributed embodiments may utilize MIMO in the form of Cooperative Multipoint (CoMP, also referred to as e.g., Network MIMO (N-MIMO), Distributed MIMO (D-MIMO), or Cooperative MIMO (Co-MIMO), etc.) transmission, in which multiple access points maintaining multiple corresponding basic service sets, can conduct respective cooperative or joint communications with one or more STAs 106. CoMP communication between STAs and APs can utilize for example, a joint processing scheme, in which an access point associated with a station (a BSS AP) and an access point that is not associated with a station (a OBSS AP) cooperate to engage in transmitting downlink data to the STA and/or jointly receiving uplink data from the STA. Additionally or alternatively, CoMP communication between an STA and multiple access points can utilize coordinated beamforming, in which a BSS AP and an OBSS AP can cooperate such that an OBSS AP forms a spatial beam for transmission away from the BSS AP and, in some aspects, at least a portion of its associated stations, thereby enabling the BSS AP to communicate with one or more of its associated stations with reduced interference.

To facilitate the coordinated beamforming approach 410 or the joint MIMO approach 415, an understanding of channel conditional between an access point and OBSS devices may provide for greater wireless communication efficiency.

Figure 5:
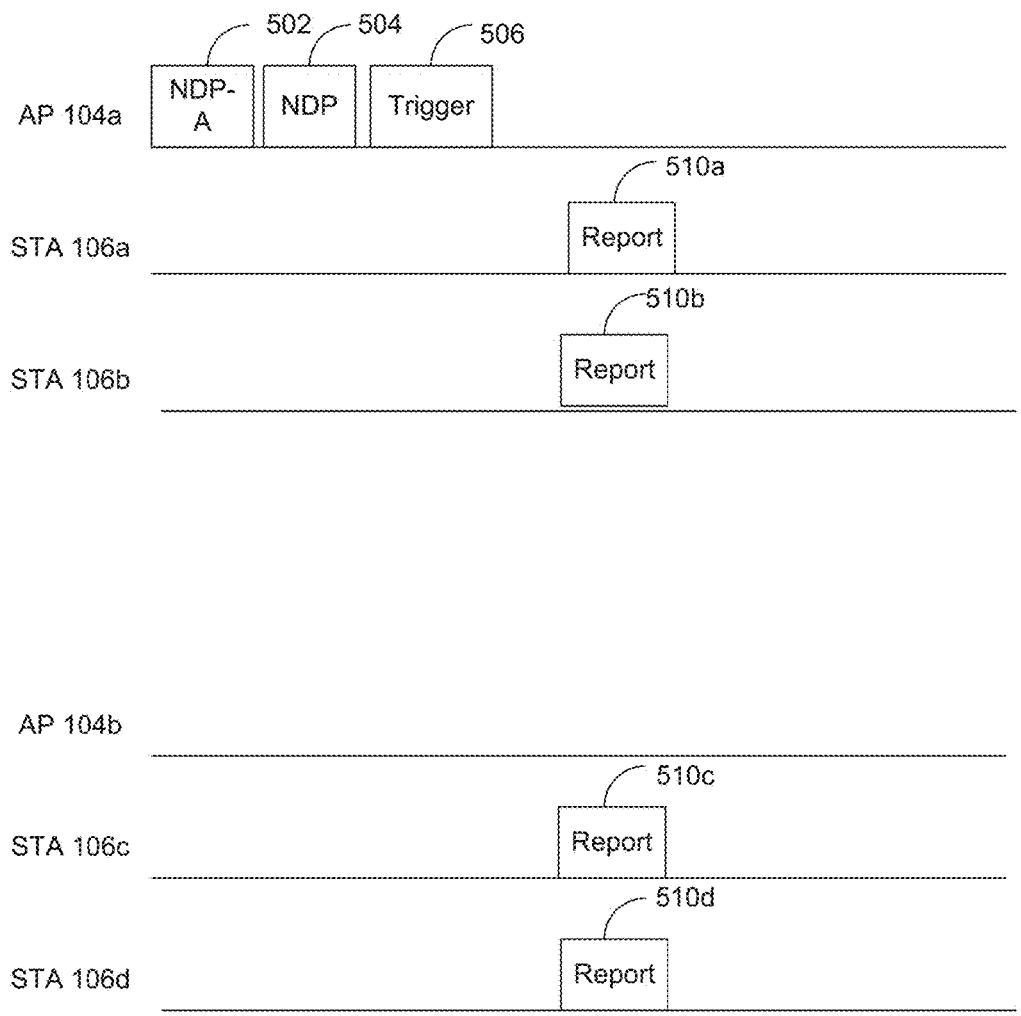
FIG. 5 is a timing diagram showing messages exchanged between an access point and a plurality of stations.

FIG. 5 is a timing diagram showing messages exchanged between an access point and a plurality of stations. FIG. 5 shows the access points 104a-b and their associated stations STA 106a-b and 106c-d with the BSSs 302a-b illustrated in FIG. 3. While FIG. 5 illustrates a wireless message exchange between a single access point 104a and a plurality of stations 106a-d, one of skill in the art would understand that a similar exchange could be performed by any number of additional access points, such as the AP 104b.

FIG. 5 shows that AP 104a transmits a sounding announce message 502. The sounding announce message indicates that a sounding frame will be transmitted, and provides an opportunity for other devices on the wireless medium to prepare to receive the sounding frame and collect information on channel conditions between the AP 104 and the receiving device. In some aspects, the sounding announce message may be a null data packet announce message (NDP-A). In some aspects, the sounding announce message 502 may include one or more of a cluster identifier, a list of basic service set identifiers (BSSIDs) to which the sound message pertains (e.g., BSSID of APs included in a cluster), or a transmitter address (address of the device transmitting the sounding announce message 502). This information may, in some aspects allow devices receiving the sounding announce message to determine whether the sounding announce message is for a cluster in which the receiving device is included. For example, STAs within a cluster may be provided with a cluster identifier during association with their access point. Thus, when an STA receives a sounding announce message 502 including the cluster identifier, the STA can determine if it should be prepared to measure channel characteristics based on the sounding frame 504, discussed below. In some aspects, the transmission address of the sounding announce message may be a media access control address or station address of the AP transmitting the sounding announce message. This station address may also be the BSSID for the AP. If the AP is included in a cluster, a station in the cluster may have a list of BSSIDs of APs included in the cluster. The STA may have received this information during association with its AP. The station can then identify that a sounding announce message including the station address of an AP is from an AP within the STAs cluster or not.

The AP 104*a* then transmits a sounding frame 504. In some aspects, the sounding frame 504 may be a null data packet (NDP). Each of the STAs 106*a-b* and STAs 106*c-d* may receive the sounding frame 504. Based on their reception of the sounding frame 504, one or more of the STAs 106*a-b* and/or STAs 106*c-d* may determine channel conditions between the AP 104*a* and the receiving STA. In some aspects, the sounding frame 504 identifies, for example via a field in the sounding frame, a cluster identifier for a cluster including the AP 104*a* and AP 104*b*. Each of the STAs 106*a-d* may also be aware of the cluster in which they operate. For example, as described earlier, the STAs 106*a-d* may receive the cluster identifier as part of an association process with their respective BSS APs. Alternatively, the sounding frame 504 may identify a transmitter address of the device transmitting the sounding frame, which may, in some aspects, be equivalent to a BSSID for an access point transmitting the sounding frame 504. In some aspects, a receiving station may utilize the transmitter address to determine whether the sounding frame should be acted upon. In other embodiments, the sounding frame 504 may include a list of BSSIDs of access points included in a cluster. The station may also know its own BSSID, for example, as a result of an association process with its home access point. The station may then compare the list of BSSIDs in the sounding frame with its own BSSID to determine whether the sounding frame applies to it.

In some other aspects, the AP 104*a* and AP 104*b* may maintain a list of BSS identifiers (BSSID) of APs within a cluster including the AP 104*a* and AP 104*b*. The STAs 106*a-d* may decode received packets to determine whether the received packet is from a device within the cluster, by comparing a BSSID included in the packet with the list of BSSIDs. In some of these embodiments, the sounding frame 504 may include the list of BSSIDs of APs within the cluster.

The AP 104*a* then transmits a trigger message 506. The trigger message 506 is configured to indicate to the stations 106*a-d* that they should transmit a beamforming report to the AP 104*a*. Upon receiving the trigger frame 506, each of the stations 106*a-d* transmit a beamforming report 510*a-d* respectively. In certain embodiments, a message (e.g., a "frame," a "trigger frame," a "first message," a "first frame," a "first trigger frame," etc.) may be transmitted from a component of a cluster (e.g., from an access point of a plurality of access points or from a station of a plurality of stations). As one example, the trigger frame 506 may be sent from one AP to multiple APs. In some aspects, as shown, the beamforming reports 510*a-d* collectively form an uplink OFDMA transmission to the AP 104*a*. In other aspects, the individual beamforming reports 510*a-d* may be transmitted individually to the AP 104*a* as separate single user transmissions. The beamforming reports received by the AP 104*a* may provide indications of channel conditions, such as path loss or received signal strength indications (RSSI) between the AP 104*a* and each of the individual stations 106*a-d*. These indications of channel conditions may be utilized to perform the coordinated beamforming and/or joint MIMO arbitration methods described earlier with respect to FIG. 3. As described herein, a trigger frame (e.g., the trigger frame 506) may be an extension of a frame described in a particular Standard, for example, the "Trigger-Frame" (e.g., for addressing multiple STAs) described in IEEE 802.11ax. In an exemplary implementation, the Trigger-Frame may be for addressing multiple STAs. In alternative and/or subsequent implementations, the trigger frame 506 may be a frame or an extension of a frame (e.g., for addressing multiple APs) described in one or more subsequent Standards.

To facilitate a multi-user uplink of the beamforming reports 510*a-d*, the trigger 506 may be generated by the AP 104*a* to include a cluster identifier of APs within the cluster that includes the AP 104*a* and AP 104*b*. Alternatively, the trigger frame may include a list of BSSIDs for APs within the cluster. This information allows receiving devices to determine whether they are addressed by the trigger frame 506. In some aspects, devices may be configured to continuously monitor transmissions of OBSS devices so as to detect, for example, a sounding announce frame 502 and/or sounding frame 504. In some other aspects, APs within a cluster may coordinate sounding processes. In response to the coordination, an AP may signal devices within its BSS that a sounding process is to begin within a time period. This signal may selectively enable devices within the BSS to begin monitoring OBSS traffic.

Figure 6:
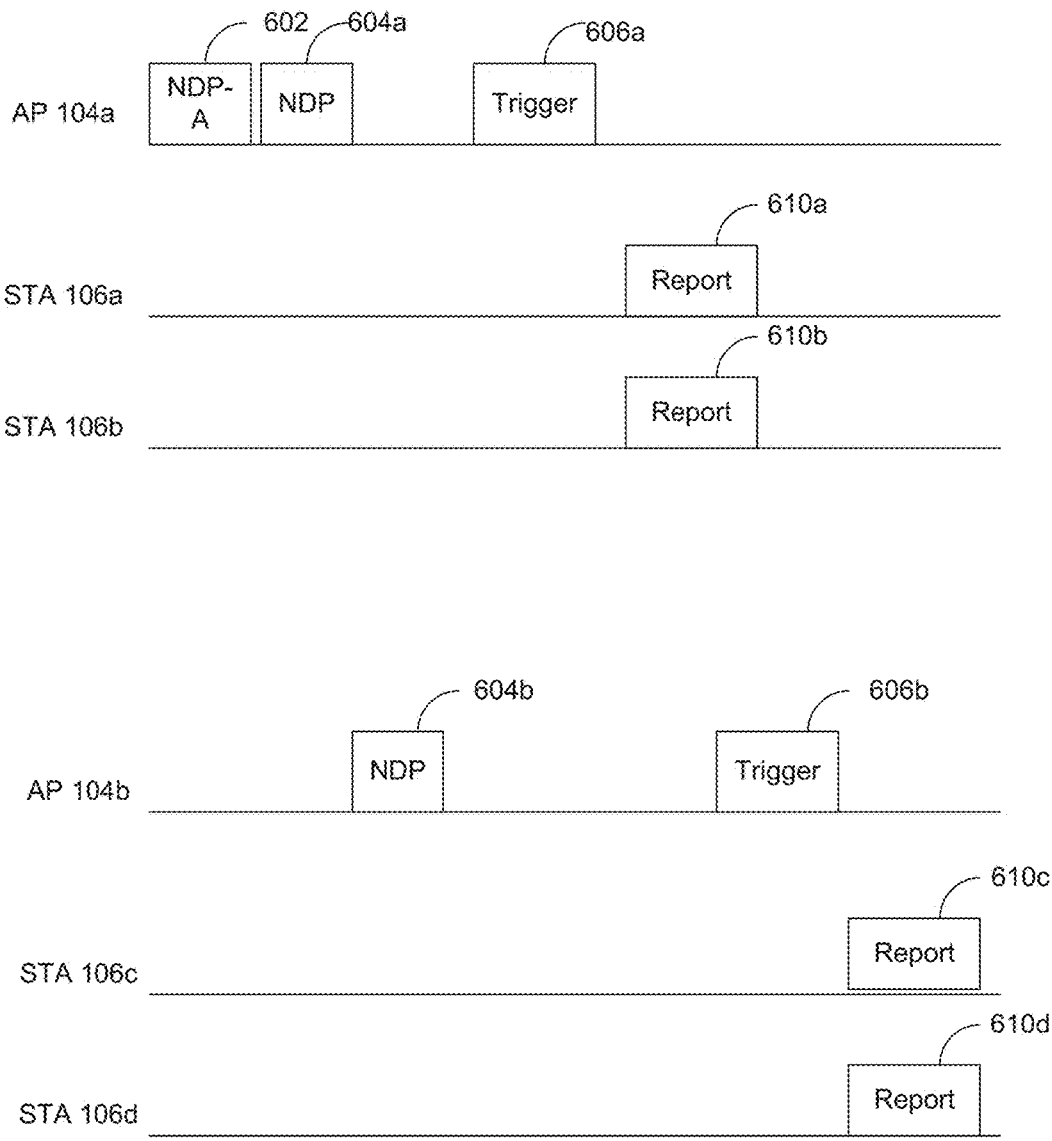
FIG. 6 is another timing diagram showing messages exchanged between two access points and a plurality of stations.

FIG. 6 is another timing diagram showing messages exchanged between two access points and a plurality of stations. FIG. 6 shows the access points 104*a-b* and their associated stations STA 106*a-b* and 106*c-d* with the BSSs 302*a-b* illustrated in FIG. 3. FIG. 6 shows that AP 104*a* transmits a sounding announce message 602. The sounding announce message 602 indicates that one or more sounding frames, such as sounding frames 604*a-b* may be transmitted. The sounding announce message 602 may indicate, for example, via one or more fields set to one or more predetermined values, which APs are to generate sounding messages in response to the sounding announce message 602. For example, in some aspects, the sounding announce message may include BSSIDs of the APs that are to send sounding messages in response to the sounding announce message 602.

The sounding announce message 602 may also provide an opportunity for other devices on the wireless medium to prepare to receive the sounding frame(s) and collect information on channel conditions between the transmitters of the sounding frames (e.g., AP 104*a-b*) and the receiving device. In some aspects, the sounding announce message 602 may be a null data packet announce message (NDP-A).

The AP 104*a* then transmits a sounding frame 604*a*. In some aspects, the sounding frame 604*a* may be a null data packet (NDP). Each of the STAs 106*a-b* and STAs 106*c-d* may receive the sounding frame 604*a*. Based on their reception of the sounding frame 604*a*, one or more of the STAs 106*a-b* and/or STAs 106*c-d* may determine channel conditions between the AP 104*a* and the receiving STA. The AP 104*b* transmits the sounding message 604*b* in response to the sounding announce message 602 transmitted by the AP 104*a*. Each of the STAs 106*a-b* and STAs 106*c-d* may receive the sounding frame 604*b*. Based on their reception of the sounding frame 604*b*, one or more of the STAs 106*a-b* and/or STAs 106*c-d* may determine channel conditions between the AP 104*b* and the receiving STA.

The AP 104*a* then transmits a trigger message 606*a*. The trigger message 606*a* is configured to indicate to the stations 106*a-b* that are within the same BSS as the AP 104*a* transmitting the trigger that they should transmit a beamforming report to the AP 104*a*. Upon receiving the trigger frame 606*a*, each of the stations 106*a-b* transmit an individual beamforming report 610*a-b* respectively. In some aspects, as shown, the beamforming reports 610a-b collectively form an uplink OFDMA transmission to the AP 104a. In other aspects, the individual beamforming reports 610a-b may be transmitted individually to the AP 104a. The beamforming reports received by the AP 104a may provide indications of channel conditions between the AP 104a and each of the individual stations 106a-b. The beamforming reports 610a-b may also provide indications of channel conditions between the AP 104b and each of the individual stations 106a-b. In some aspects, the beamforming reports 610a-b may include sounding information for all APs within a cluster. These indications of channel conditions may be utilized to perform the coordinated beamforming and/or joint MIMO arbitration methods described earlier with respect to FIG. 3. The AP 104a may transmit at least portions of the beamforming reports 610a-b to other access points. For example, in some aspects, beamforming information relating to paths between stations STA 106a or 106b and AP 104b, which may be included in the beamforming reports 610a or 610b, may be transmitted to AP 104b by the AP 104a. This transmission is not illustrated in FIG. 6.

The AP 104b transmits a trigger message 606b. The trigger message 606b is configured to indicate to the stations 106c-d that are within the same BSS as the AP 104b transmitting the trigger that they should transmit a beamforming report to the AP 104b. The trigger message 606b may indicate which stations to respond to it in several ways. For example, the trigger message 606b may identify the AP 104b. Since the AP 104b is within the same BSS as the stations 106c-d, in some embodiments, the stations may respond based on this equivalent BSS. In other embodiments, the trigger message 606b may explicitly list the stations that are to respond to the trigger message. For example, a list of media access control addresses or association identifiers may be provided in the trigger message.

Upon receiving the trigger frame 606b, each of the stations 106c-d transmit an individual beamforming report 610c-d respectively. In some aspects, as shown, the beamforming reports 610c-d collectively form an uplink OFDMA transmission to the AP 104b. In other aspects, the individual beamforming reports 610c-d may be transmitted individually to the AP 104b. The beamforming reports received by the AP 104b may provide indications of channel conditions between the AP 104b and each of the individual stations 106c-d. The beamforming reports 610c-d may also provide indications of channel conditions between the AP 104a and each of the individual stations 106c-d. These indications of channel conditions may be utilized to perform the coordinated beamforming and/or joint MIMO arbitration methods described earlier with respect to FIG. 3.

To accomplish the sounding process described by FIG. 6, in some aspects, the sounding announce message 602 may identify which stations that are outside of the AP 104a BSS (i.e. outside BSS 302a of FIG. 3) are to determine sounding information based on sounding frames 604a transmitted in response to the sounding announce message 602. Furthermore, to ensure uniqueness between identifiers of stations across the multiple BSSs, one or more of the trigger frames 606a-b and beamforming reports 610a-b may utilize a MAC address of a station to identify the station. For example, the trigger frames 606a may indicate, via the MAC address of stations 106a-b should transmit the beamforming reports 610a-b. Similarly, the trigger frame 606b may indicate, via MAC addresses of stations 106c-d, that these stations are to transmit the beamforming reports 610c-d. Each of the beamforming reports 610a-d may identify the respective stations to which they apply based on MAC addresses of the respective stations.

In some aspects, transmission of the sounding announce message 602 by the AP 104a is coordinated with the AP 104b. For example, the AP 104a-b may negotiate to determine times for transmission of the sounding announce message 602 and another sounding announce message (not shown) that may be transmitted by the AP 104b. One of skill in the art would understand that the description of FIG. 6 is exemplary for AP 104a, but the described process could also be used to enable AP 104b to gather beamforming reports from the STAs 106a-d.

Figure 7:
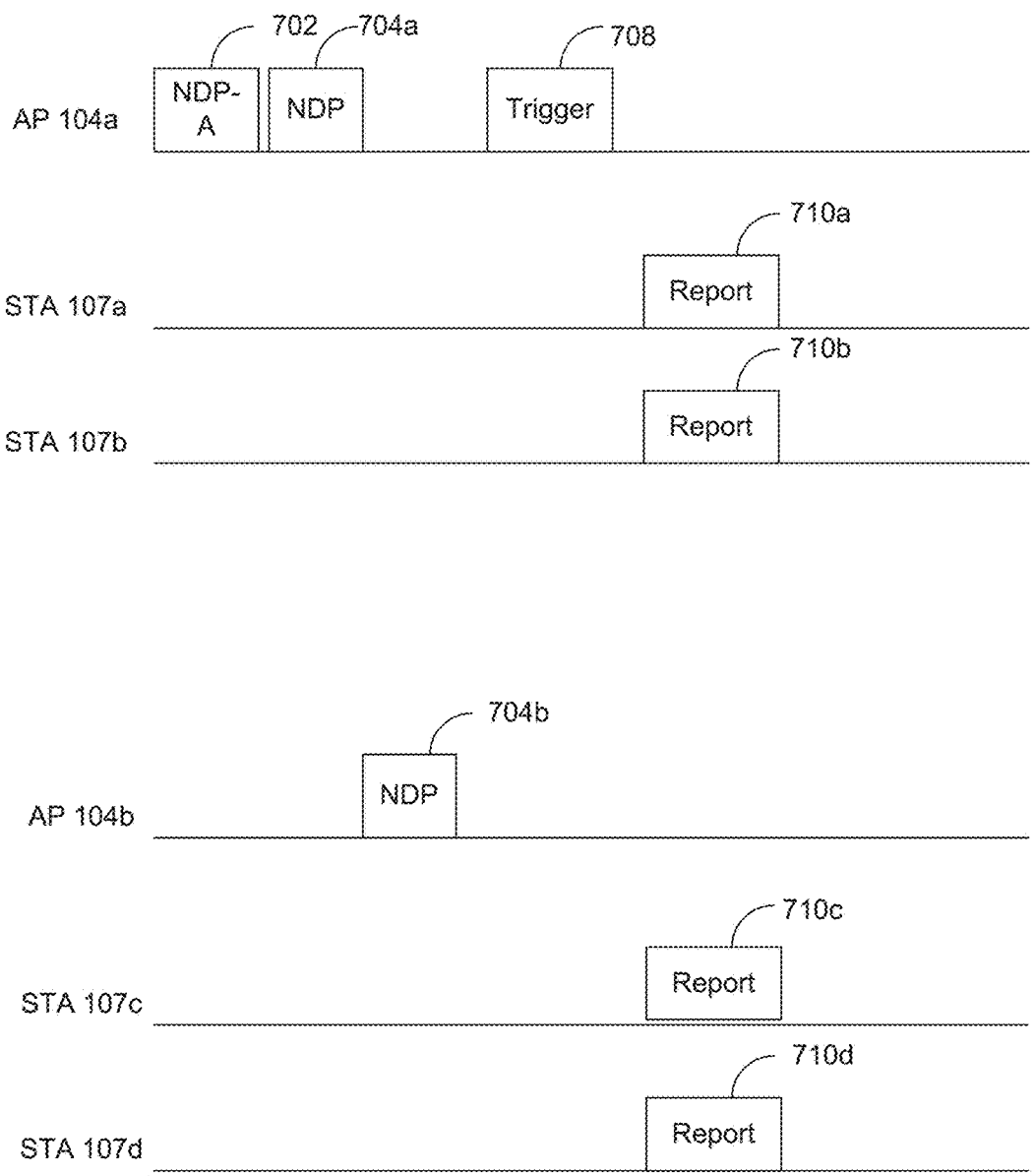
FIG. 7 is another timing diagram showing messages exchanged between two access points and a plurality of stations.

FIG. 7 is another timing diagram showing messages exchanged between two access points and a plurality of stations. FIG. 7 shows the access points 104a-b and their associated stations STA 106a-b and 106c-d with the BSSs 302a-b illustrated in FIG. 3. The timing diagram operates similarly to the timing diagram of FIG. 6, except that the AP 104a transmits a single trigger frame 708 that indicates that stations within both the BSS 302a and BSS 302b (shown in FIG. 7 as example stations STA 106a-b and STAs 106c-d respectively) that should transmit their beamforming reports to the AP 104a. In some aspects, as shown, the beamforming reports 710a-d may be transmitted by the STAs 106a-d respectively as part of a multi-user uplink transmission to the AP 104a. In some other aspects, one or more of the individual beamforming reports 710a-d may be transmitted to the AP 104a as a single user message.

Thus, in response to the trigger frame 708 STAs 106a-d transmit their beamforming reports 710a-d to the AP 104a. As described above with respect to FIG. 6, the beamforming reports include sounding information for channel conditions between the respective STA and both the AP 104a and AP 104b, based on the sounding frames 704a-b respectively. The AP 104a may share information contained in the beamforming reports 710a-d with the AP 104b, for example, via a back-haul network communication channel in some aspects.

To accomplish the sounding process illustrated in FIG. 7, the STAs 106c-d may be configured to receive and processing the sounding announce message 702, sounding frame 704a, and trigger frame 708, which are transmitted by the AP 104a, which is outside the BSS of the STAs 106c-d.

Figure 8:
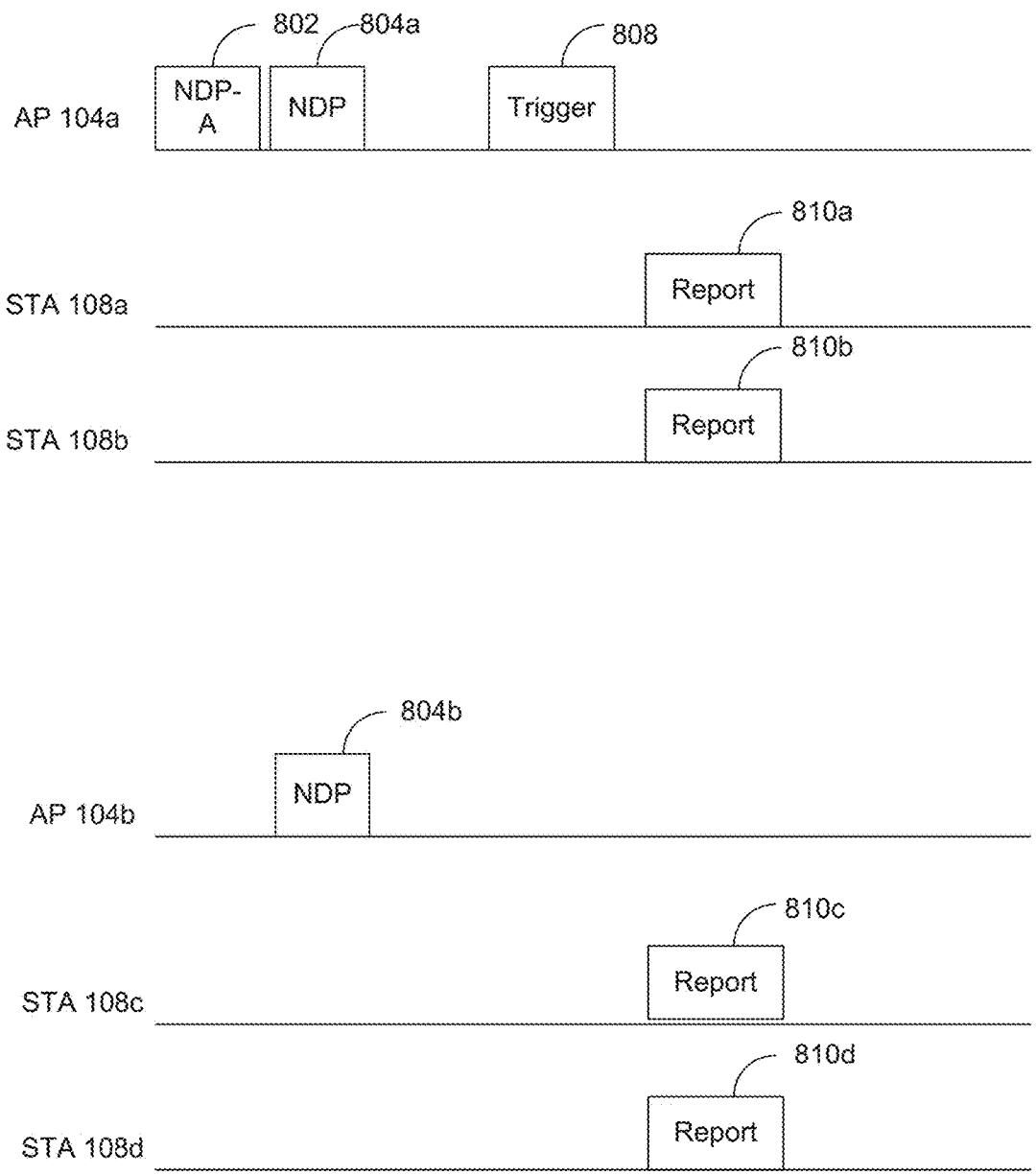
FIG. 8 is another timing diagram showing messages exchanged between two access points and a plurality of stations.

FIG. 8 is another timing diagram showing messages exchanged between two access points and a plurality of stations. FIG. 8 shows the access points 104a-b and their associated stations STA 106a-b and 106c-d with the BSSs 302a-b illustrated in FIG. 3. The timing diagram operates similarly to the timing diagram of FIG. 7, except that the sounding frames 804a-b are transmitted by the APs 104a-b simultaneously as part of a joint MIMO transmission. In some aspects, the APs 104a-b may transmit the two NDP frames using interleaved tones, or Q-matrix in some aspects.

In some aspects, the APs 104a-b may synchronize transmission of the sounding frames 804a-b based on a transmission of the sounding announce frame 802. For example, the APs 104a-b may be configured to transmit the sounding frames 804a-b a short inter-frame space (SIFS) time after transmission of the sounding announce frame 802. More specifically, the APs 104a-b may simultaneously transmit null data packet (NDP) frames. In some aspects, the NDP frames from each AP may be separated in frequency and/or spatial domain using interleaving tones and/or a Q-Matrix.

Figure 9:
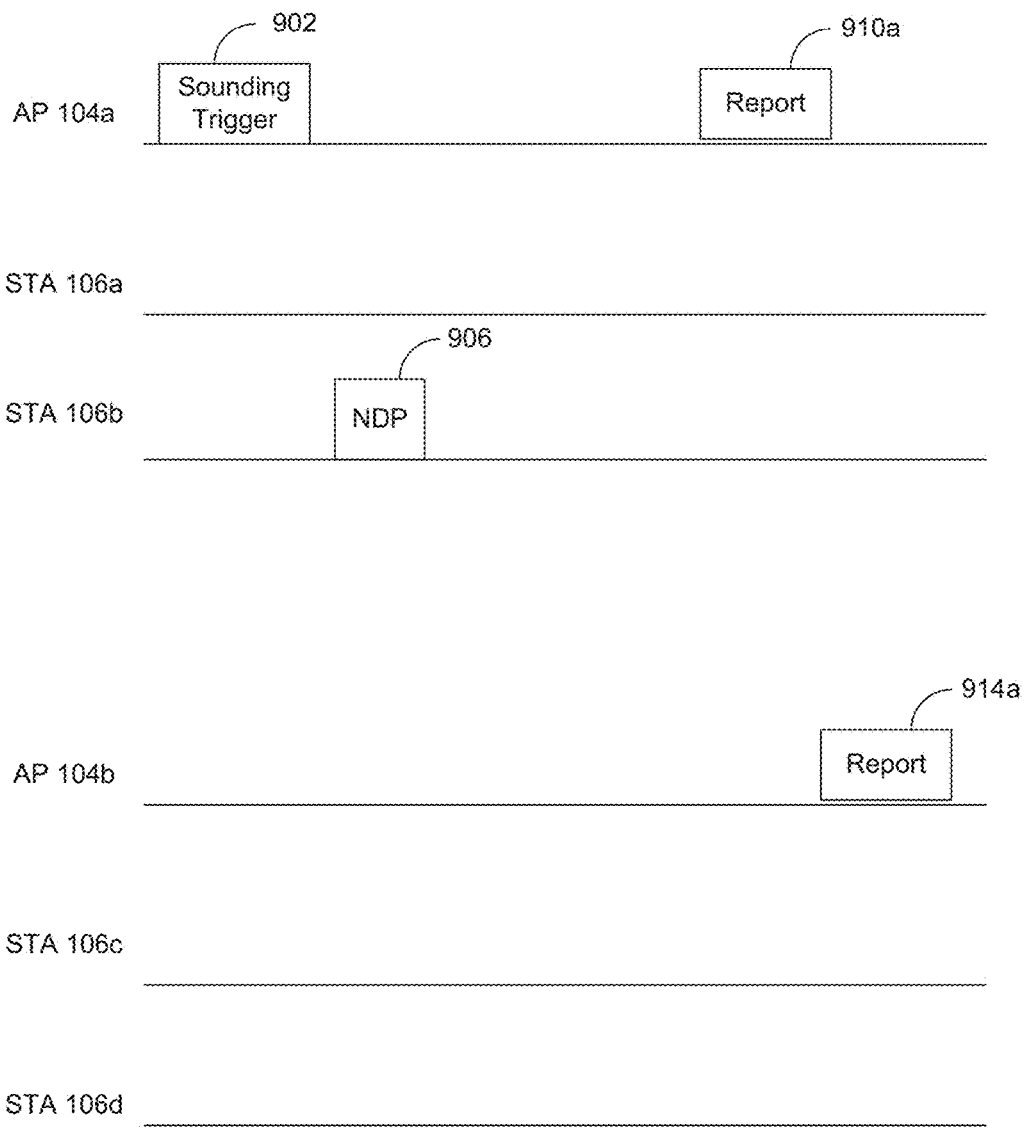
FIG. 9 is another timing diagram showing messages exchanged between two access points and a plurality of stations.

FIG. 9 is another timing diagram showing messages exchanged between two access points and a plurality of stations. FIG. 9 shows the access points 104a-b and their associated stations STA 106*a-b* and 106*c-d* with the BSSs 302*a-b* illustrated in FIG. 3. The timing diagram of FIG. 9 functions to provide the AP 104*a* with sounding information for communication paths between at least some stations within a BSS of the AP 104*a* (e.g., BSS 302*a* of FIG. 3) and two or more access points, such as the APs 104*a-b*.

FIG. 9 illustrates that the AP 104*a* transmits a sounding trigger frame 902. The sounding trigger frame indicates, via for example a field having a predetermined value, that one or more stations within the AP 104*a* BSS (e.g., BSS 302*a* of FIG. 3) should send sounding frames 904*a-c*. In some aspects, the trigger frame 902 identifies stations that are to transmit the sounding frames. In some aspects, the stations may be indicated via a list of association identifiers, or media access control (MAC) addresses in the trigger frame.

In some aspects, the AP 104*a* and AP 104*b* (and in some aspects, additional access points) may coordinate a timing of the sounding trigger 902. For example, the APs may coordinate the timing such that separate sounding process(es) initiated by two or more APs do not overlap.

In some aspects, the AP 104 determines the STAs to which the sounding trigger 902 is addressed based on a characterization of the STAs as reuse or non-reuse STAs. For example, in some aspects, a path loss or signal strength of a communication path between the AP 104 and an STA may determine, at least in part, whether the STA is a reuse STA or a non-reuse STA. For example, if the path loss is greater than a threshold, the STA may be a non-reuse STA.

Upon receiving the sounding trigger 902, addressed STAs may transmit a sounding frame. FIG. 9 illustrates that STA 106*b* is addressed by the sounding trigger 902, and responds by transmitting a sounding frame 906. In some aspects, as illustrated, the sounding frame 906 may be a null data frame or packet (NDP).

Based on reception of the sounding frame 906, each of APs 104*a-b* may determine one or more characteristics of a communication path between the STA 106 and the AP 104*a* and/or the AP 104*b*. AP 104*b* may transmit this information in a beamforming report 914 to the AP 104*a*. In some aspects, this information may be transmitted over a back haul network between two or more access points.

Figure 10:
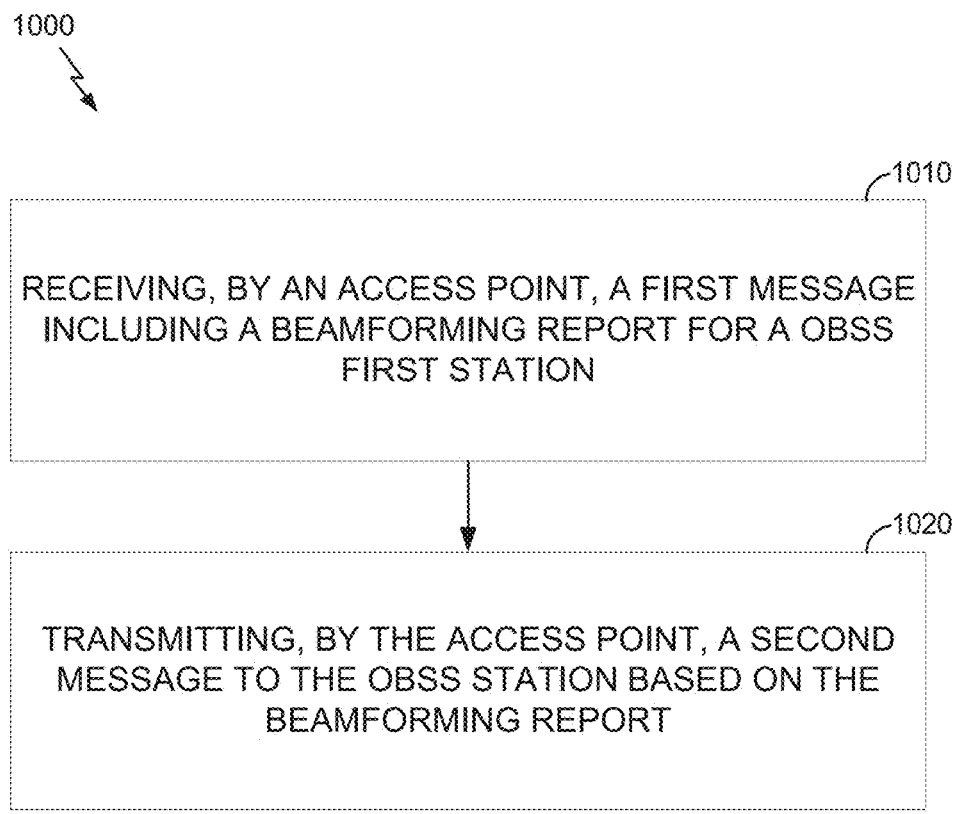
FIG. 10 is a flowchart for an exemplary method of sounding a wireless network.

FIG. 10 is a flowchart for an exemplary method of sounding a wireless network. In some aspects, the process 1000 discussed below with respect to FIG. 10 may be performed by the device 202. For example, in some aspects, instructions stored in the memory 206 may configure the hardware processor 204 to perform one or more of the functions discussed below.

The process 1000 discussed below with respect to FIG. 10 provides for the gathering of information on a communication path between an access point and one or more stations that may not be associated with the station. In other words, the access point and stations may be in different basic service sets. The information on the communication path may include one or more of channel coefficients, path loss information, and RSSI indications, along with possibly other information that can assist a transmitting device in determining how best to transmit a signal over the communication path to the destination device to provide for an enhanced quality of the signal when received by the device.

Information on the communication path between unassociated devices, as described above, may be utilized when performing one or more of the joint MIMO communications, utilizing multiple BSSs for transmission over a single channel simultaneously. Since signals from the multiple BSSs interference with each other, the information on the communication paths can enable transmitting devices within the multiple BSSs to tailor their transmission signals to reduce this interference in some situations. The information on the communication paths may also be utilized for coordinated beamforming transmissions. Such transmissions may include transmission of a signal nulling interference being caused by a second signal that is also being transmitted simultaneously. The nulling signal may reduce interference at a device caused by the second signal.

In some aspects, process 1000 discussed below with respect to FIG. 10 may be utilized by an access point to facilitate the collection of sounding information for communication path(s) between stations within a cluster of access points and the access points within the cluster. The access point may transmit a sounding frame to at least OBSS stations, which utilize the sounding frame to characterize a communication path between the access point and the receiving station. The access point may then request that either its BSS stations or all stations report their sounding information to either itself or their BSS access points. In some aspects, the access point performing process 1000 does not request the sounding information be transmitted. Instead, another access point in the cluster may accomplish this.

In block 1010, a first message is received by a first access point. The first access point may coordinate communications for a basic service set. The first access point may be associated with one or more stations. The first message is received from a first station that is outside the basic service set. In other words, the first station is not associated (e.g., has not performed an association procedure, in which the first station and the access point exchange association messages, such as an exchange of association request/response messages) with the first access point. The first message includes a beamforming report for the OBSS first station. The beamforming report may include information relating to channel conditions between the OBSS first station and the access point.

In block 1020, a second message is transmitted to the OBSS first station based on the beamforming report. In some aspects the OBSS first station may be a station that is associated with a different access point than the first access point. In some aspects, the second message may be configured to null interference created by transmission of a third message by the first access point to a device within the BSS of the first access point. For example, as described above with respect to FIG. 3, the OBSS device may be a non-reuse station associated with a different access point. The beamforming report for the OBSS device may allow the first access point to coordinate a simultaneous transmission with the second access point, with the second access point transmitting at least to the first device and the first access point transmitting to the first device (OBSS) and the third device (BSS) device.

Some aspects of process 1000 include transmitting a beamforming trigger message to the first station. The beamforming trigger message may be generated by the first access point to indicate, for example, via a field having a predetermined value, that the first station, and, in some aspects, other stations outside the BSS of the first access point, is/are to transmit its beamforming report to the first access point upon reception of the trigger message. In some aspects, the first access point transmits a sounding frame prior to the transmission of the trigger message. In some aspects, the beamforming trigger message is transmitted in response to transmission of the sounding frame, since it stimulates collection of beamforming information resulting from analysis of the sounding frame by receiving devices. In some aspects, the sounding frame is a null data packet or frame (NDP). However, the sounding frame may be any frame configured to provide a test frame for receiving devices to measure one or more characteristics of a communication path between a transmitter and receiver of the frame.

The sounding frame may be used by the first station to determine one or more characteristics of a communication path between the first access point and the first station. The characteristics may include one or more of channel coefficients, path loss indications, and received signal strength indications (RSSI) relating to the channel The communication path may be a particular channel of the wireless medium (such as a particular spatial or frequency channel). The particular channel may be used by both the first and second access point for the simultaneous transmissions described above.

In some aspects, the first access point may transmit a sounding announce message prior to transmission of the sounding frame. The sounding announce message may indicate, for example, via a field set to a predetermined value, that receiving devices should prepare to receive the sounding message, and upon receiving said sounding message, characterize the communication path from the transmitting first access point to the receiving device.

In some aspects, the first and second access points are preconfigured to be part of an access point cluster. Alternatively, formation of the cluster may be accomplished dynamically, via the exchange of electronic messages between the first and second access points. The cluster may be assigned an identifier. This identifier may be distributed to stations associated with the first access point, for example, via an association process including an association request/response message exchange Alternatively, the association process may communicate cluster information to associated stations by transmitting a list of one or more BSSIDs of APs within the cluster as part of the association process, for example, in a management frame (e.g., an association response frame) transmitted from the first access point to one or more associated station(s).

In some aspects, generation of association identifiers for stations associated with the first access point may include a portion of the association identifier that is unique across access points within the cluster. This may ensure stations within a cluster each have a unique association identifier.

In some aspects the sounding frame is generated by the first access point to include an indication of the cluster. The indication may be the cluster identifier in some aspects. Alternatively, the indication may include one or more BSSIDs of APs included in the cluster. This may allow devices receiving the sounding frame to determine whether they are included in the cluster identified by the sounding frame, and to generate communication channel statistics as appropriate.

In some aspects of process 1000, the first access point receives a second beamforming report from a second device outside the basic service set. This device may be an OBSS station. In some aspects, the first and second beamforming reports may be transmitted to the first access point as part of a multi-user uplink communication.

In some aspects of process 1000, the beamforming report identifies the first station via a media access control (MAC) address of the first station. For example, the multi-user uplink communication may include a per user info field for each device participating in the multi-user uplink. Prior implementations of this field may utilize an association identifier to identify devices participating in the communication. These prior association identifiers may not be unique across access points within the cluster and their associated stations. Thus, use of a media access control (MAC) address to identify the stations may be preferred, despite its increased length relative to known formats of association identifiers. Alternatively, some aspects may utilize one of the disclosed methods of generating association identifiers that are unique within a cluster of access points. In these aspects, the per user info fields of the multi-user uplink transmission may identify stations participating in the uplink communication via the new form of association identifier.

Another aspect disclosed is a non-transitory computer readable storage medium comprising instructions that when executed cause an electronic hardware processor to perform a method of sounding a wireless network. The method includes receiving, by a first access point, a first message including a beamforming report for a first station associated with the first access point, decoding the beamforming report to determine first station sounding information for a second access point; and transmitting the sounding information to the second access point.

In another aspect, the method performed by the non-transitory computer readable medium further comprises negotiating with a second access point to form a cluster including the first and second access points; assigning a cluster identifier to the cluster; associating with a second station based on the cluster identifier; generating a sounding frame to include the cluster identifier in a field (e.g., a Transmit Identity field) of the sounding frame; and transmitting the sounding frame.

In another aspect, the method performed by the non-transitory computer readable medium further comprises generating a sounding announce message to include the cluster identifier; and transmitting the sounding announce message. In another aspect, the method performed by the non-transitory computer readable medium further comprises negotiating with a second access point to form a cluster including the first and second access points; generating a sounding frame to include basic service set identifiers for access points included in the cluster; and transmitting the sounding frame.

In another aspect, the method performed by the non-transitory computer readable medium further comprises generating an association message to include the basic service set identifiers for access points included in the cluster; and transmitting the association message to a second station to associate the access point with the second station. In another aspect, the method performed by the non-transitory computer readable medium further comprises generating a sounding announce message to include the basic service set identifiers for access points included in the cluster; and transmitting the sounding announce message.

In another aspect, the method performed by the non-transitory computer readable medium further comprises decoding the beamforming report to determine sounding information for a communication path between the device and a second access point. In another aspect, the method performed by the non-transitory computer readable medium further comprises decoding the beamforming report to determine second sounding information for a second communication path between the device and the access point. In another aspect, the method performed by the non-transitory computer readable medium further comprises receiving a second beamforming report from a second device unassociated with the access point. In such aspect, the first beamforming report and the second beamforming report are received in a multi-user uplink transmission.

In another aspect, the method performed by the non-transitory computer readable medium further comprises transmitting a beamforming trigger message to the device, the trigger message requesting a transmission of the beamforming report from the device. In such aspect, the transmission of the beamforming trigger message is in response to the transmission of the sounding frame. Further in such aspect, the method performed by the non-transitory computer readable medium further comprises negotiating with a second access point to determine a cluster identifier, the cluster identifier associating the first and second access point; and generating the trigger message to include the cluster identifier. Further, the method performed by the non-transitory computer readable medium further comprises negotiating with a second access point to determine an association between the first and second access point; and generating the trigger message to include basic service set identifiers (BSSIDs) for the first and second access points based on the association.

In another aspect, the method performed by the non-transitory computer readable medium further comprises decoding a user info field of the beamforming report to determine a media access control address of the device. In such aspect, the method further comprises generating an association identifier for a second station to include an identifier of the access point; associating with the second station based on the association identifier; and decoding a user info field in the first message to determine an association identifier for the second station.

Figure 11:
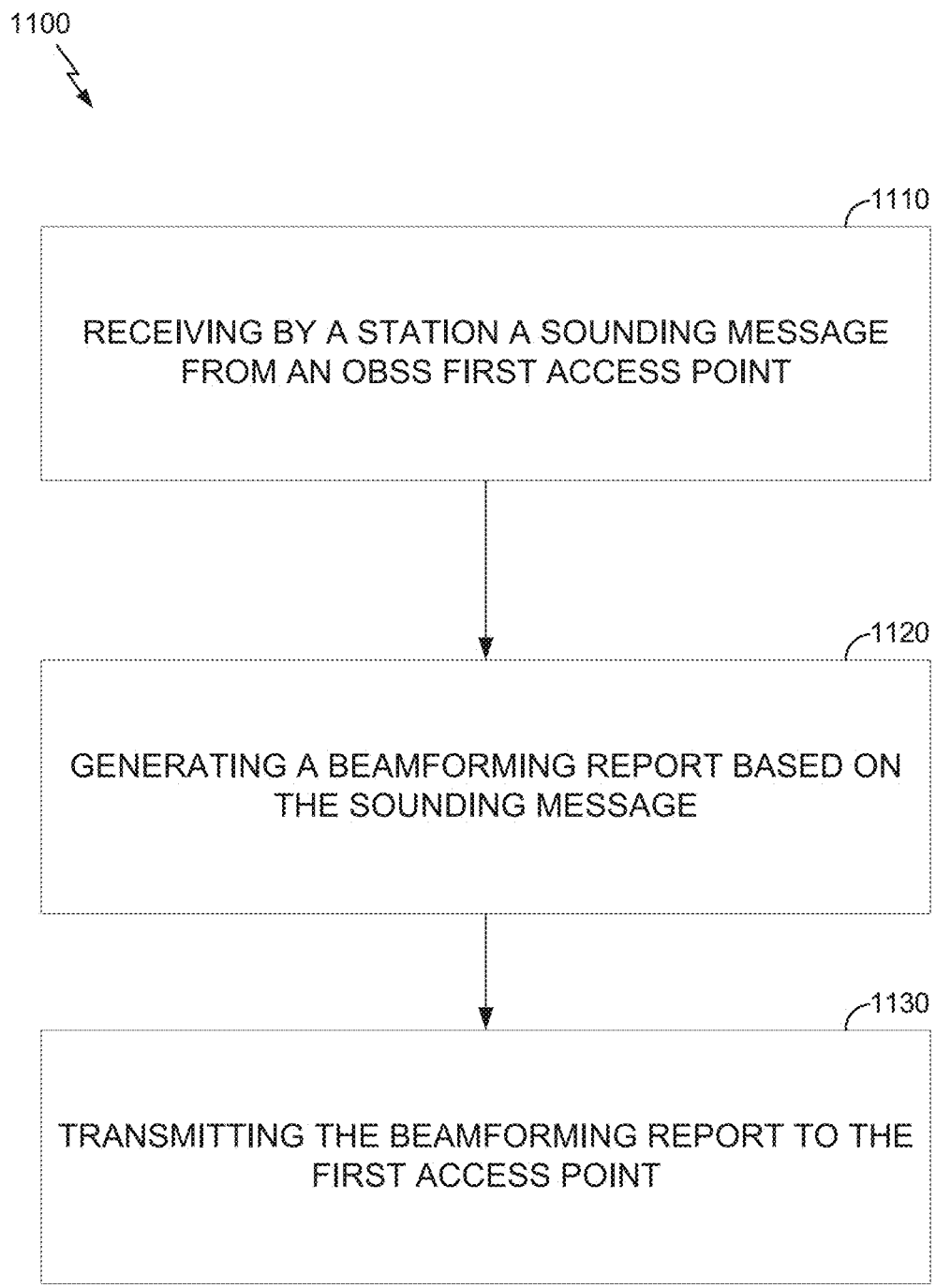
FIG. 11 is a flowchart for an exemplary method of sounding a wireless network.

FIG. 11 is a flowchart for an exemplary method of sounding a wireless network. In some aspects, the process 1100 discussed below with respect to FIG. 11 may be performed by the device 202. For example, in some aspects, instructions stored in the memory 206 may configure the hardware processor 204 to perform one or more of the functions discussed below.

The process 1100 discussed below with respect to FIG. 11 provides for the gathering of information on a communication path between an access point and one or more stations that may not be associated with the station. In other words, the access point and stations may be in different basic service sets. The information on the communication path may include one or more of channel coefficients, path loss information, and RSSI indications, along with possibly other information that can assist a transmitting device in determining how best to transmit a signal over the communication path to the destination device to provide for an enhanced quality of the signal when received by the device.

Information on the communication path between unassociated devices, as described above, may be utilized when performing one or more of the joint MIMO communications, utilizing multiple BSSs for transmission over a single channel simultaneously. Since signals from the multiple BSSs interference with each other, the information on the communication paths can enable transmitting devices within the multiple BSSs to tailor their transmission signals to reduce this interference in some situations. The information on the communication paths may also be utilized for coordinated beamforming transmissions. Such transmissions may include transmission of a signal nulling interference being caused by a second signal that is also being transmitted simultaneously. The nulling signal may reduce interference at a device caused by the second signal.

In some aspects, process 1100 may be utilized by stations to provide sounding information on a communication path between the station and one or more access points with which the station is not associated. The stations may receive sounding frames from OBSS access points, and report the resulting sounding information to either their BSS access point or in some aspects, to an OBSS access point that is coordinating the collection of the sounding information. For example, in some aspects, one access point within a cluster may take the lead in collecting sounding information and distributing it as necessary to other access points in the cluster. In some other aspects, each access point in the cluster may be responsible for gathering sounding information for stations within its own BSS. This sounding information includes characterization of communication paths between the BSS stations and other access points (of different BSSs). The BSS access point, after gathering the information, may distribute the sounding information to the other access points in the cluster.

In block 1100, a sounding message is received by a station from a first access point. The sounding message may be any message that allows the station to characterize a communications path between the station and the access point. In some aspects, the sounding message is a null data packet (NDP). The first access point is not associated with the station. In other words, the first access point may define or coordinate communication for a first BSS, while the station may be associated with a second access point managing or coordinating communication of a second BSS.

In block 1120, a beamforming report is generated by the station based on the sounding message. As discussed above, one or more of channel coefficients, path loss information, and RSSI indications may be generated based on the sounding message from the first access point. At least a portion of this information may be included in the beamforming report.

In block 1130, the beamforming report is transmitted to the first access point by the station.

Some aspects of process 1100 include receiving, by the station, a sounding announce message from the first access point, the sounding announce message indicating, for example, via one or more fields set to one or more predetermined values, that the station is to sound a communication from the access point. The communication is the sounding message in some aspects.

Some aspects of process 1100 include receiving, by the station a beamforming report trigger message from the first access point. The beamforming report trigger message indicates, via for example, one or more fields set to one or more predetermined values, that the station is to transmit the beamforming report to the first access point. The beamforming report is transmitted, in these aspects, in response to the beamforming report trigger message. In some aspects, the beamforming report is transmitted to the first access point as part of a joint uplink multi-user communication to the first access point.

In some aspects receiving a trigger message, the trigger message is decoded to determine whether the station is identified by the trigger, and the beamforming report is transmitted based on whether the station is identified. In some aspects, the trigger may be decoded to determine a value of a cluster identifier, media access control address, and a list of BSSIDs, and the determining of whether the station is identified is based on the decoded values. For example, if the trigger message specifies a MAC address of the station as one of the devices that should respond to the trigger message, the beamforming report may be transmitted in response to the trigger.

Another aspect disclosed is a non-transitory computer readable medium comprising instructions that when executed cause an electronic hardware processor to perform a method of sounding a wireless network, the method comprising: receiving, by a station, a sounding message from a first access point, wherein the station is associated with a second access point different than the first access point; generating, by the station, a beamforming report based on the sounding message; transmitting, by the station, the beamforming report over the wireless network.

In another aspect, the method performed by the non-transitory computer readable medium further comprises receiving, by the station, a sounding announce message from the first access point, the sounding announce message indicating the station is to sound a communication from the access point, wherein the sounding message is the communication. In another aspect, the method performed by the non-transitory computer readable medium further comprises receiving, by the station, a second sounding message from a third access point not associated with the station; and generating, by the station, the beamforming report based on the second sounding message.

In another aspect, the method performed by the non-transitory computer readable medium further comprises the first sounding message and the second sounding message being received in a joint MIMO communication from the first and third access points. In another aspect, the method performed by the non-transitory computer readable medium further comprises receiving the first sounding message and the second sounding message on interleaved tones or as a Q-matrix encoding the two sounding messages.

In another aspect, the method performed by the non-transitory computer readable medium further comprises the first sounding message being received a short inter-frame space (SIFS) time after the second sounding message. In another aspect, the method performed by the non-transitory computer readable medium further comprises receiving, by the station, a beamforming report trigger message from the first access point, the beamforming report trigger message indicating the station is to transmit the beamforming report to the first access point, wherein the transmission of the beamforming report by the station is to the first access point in response to the beamforming report trigger message identifying the first access point.

In another aspect, the method performed by the non-transitory computer readable medium further comprises receiving, by the station, a beamforming report trigger message from a second access point associated with the station, the beamforming report trigger message indicating the station is to transmit the beamforming report to the second access point, wherein the transmission of the beamforming report is to the second access point in response to the beamforming report trigger message identifying the second access point.

In another aspect, the method performed by the non-transitory computer readable medium further comprises transmitting the beamforming report as part of a joint uplink multi-user communication. In another aspect, the method performed by the non-transitory computer readable medium further comprises decoding the beamforming report trigger message to determine whether the station is identified by the beamforming report trigger message; and transmitting the beamforming report based on whether the station is identified. In another aspect, the method performed by the non-transitory computer readable medium further comprises decoding one or more of a cluster identifier, media access control address, and a list of basic service set identifiers from the beamforming report trigger message; and determining whether the station is identified based on the decoding.

Figure 12:
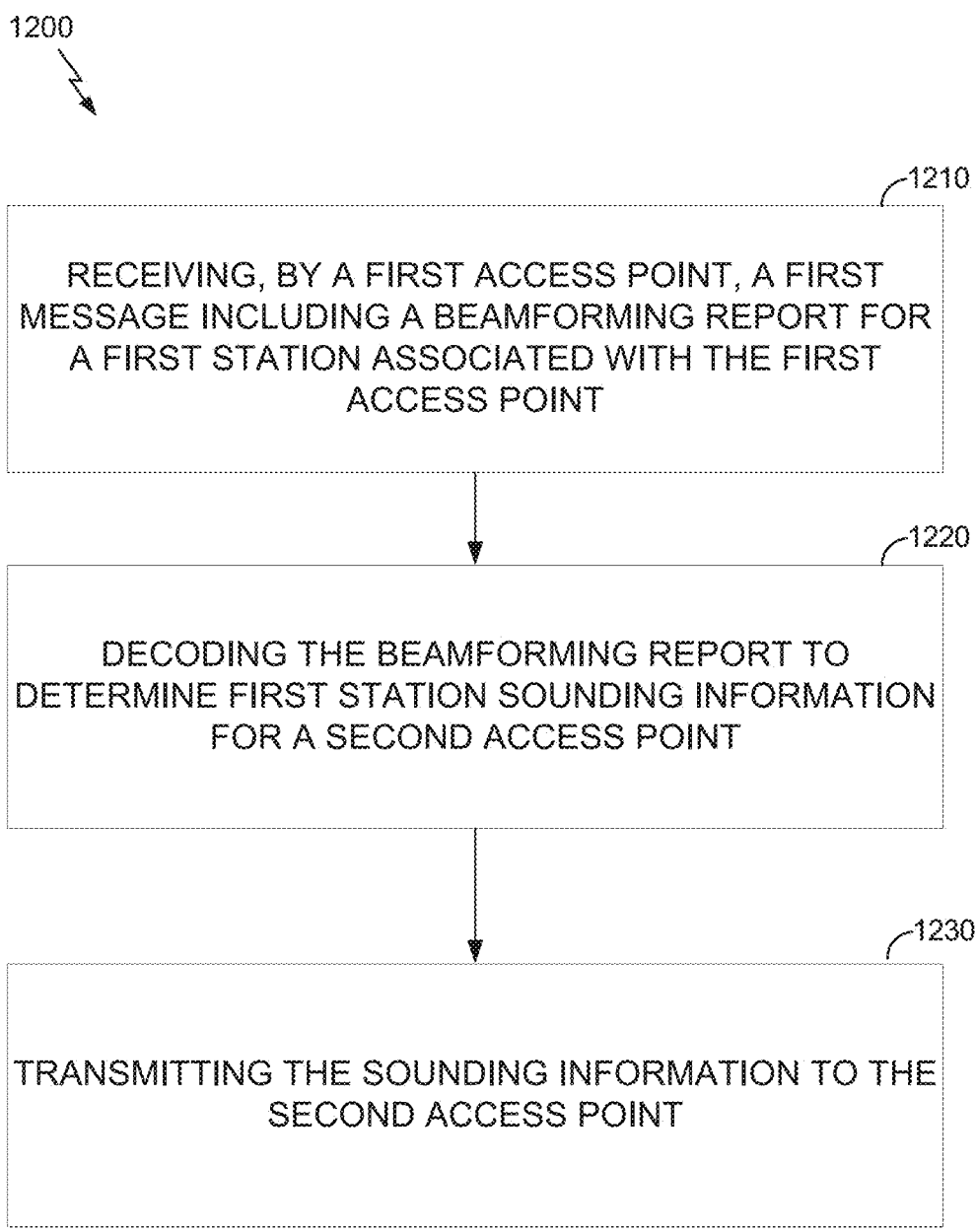
FIG. 12 is a flowchart for an exemplary method of sounding a wireless network.

FIG. 12 is a flowchart for an exemplary method of sounding a wireless network. In some aspects, the process 1200 discussed below with respect to FIG. 12 may be performed by the device 202. For example, in some aspects, instructions stored in the memory 206 may configure the hardware processor 204 to perform one or more of the functions discussed below with respect to FIG. 12.

The process 1200 discussed below with respect to FIG. 12 provides for the gathering of information on a communication path between an access point and one or more stations that may not be associated with the station. In other words, the access point and stations may be in different basic service sets. The information on the communication path may include one or more of channel coefficients, path loss information, and RSSI indications, along with possibly other information that can assist a transmitting device in determining how best to transmit a signal over the communication path to the destination device to provide for an enhanced quality of the signal when received by the device.

Information on the communication path between unassociated devices, as described above, may be utilized when performing one or more of the joint MIMO communications, utilizing multiple BSSs for transmission over a single channel simultaneously. Since signals from the multiple BSSs interference with each other, the information on the communication paths can enable transmitting devices within the multiple BSSs to tailor their transmission signals to reduce this interference in some situations. The information on the communication paths may also be utilized for coordinated beamforming transmissions. Such transmissions may include transmission of a signal nulling interference being caused by a second signal that is also being transmitted simultaneously. The nulling signal may reduce interference at a device caused by the second signal.

In some aspects, process 1200 provides for a first access point to gather sounding information from associated stations (stations within its BSS). The sounding information includes characterizations of communication paths between those stations and other access points. After receiving the sounding information, the receiving access point may transmit the sounding information to the other access points, which may utilize this information to facilitate joint MIMO communications or coordinated beamforming communications as described above, for example, with respect to FIG. 3.

In block 1210, a first message is received by a first access point from a wireless network. The first message includes a beamforming report for a first station associated with the first access point. In some aspects, the beamforming report includes data indicating characteristics of a communications path on the wireless network between the first station and a second access point. For example, one or more of channel coefficients, path loss information, and/or RSSI indications may be included in the beamforming report.

In block 1220, the beamforming report is decoded to obtain the sounding information for the first station relating to the second access point discussed above.

In block 1230, the sounding information is transmitted to the second access point.

In some aspects, the sounding information may be transmitted over the wireless network. Alternatively, the first access point may transmit the sounding information over another network, such as a back-haul network (e.g., connecting the first and second access points), for example, via a wired networking link. The second access point may utilize the sounding information when performing a coordinated beamforming or joint MIMO transmission as described with respect to FIG. 3. For example, the second access point may adjust a transmission of a signal to the first station based on the sounding information. The signal may null interference at the first station caused by another transmission performed by the second access point, for example, to a station associated with the second access point (i.e. within a BSS of the second access point).

In some aspects, the beamforming report from the first station is decoded to determine sounding information for a third access point. This information may be transmitted to the third access point by the first access point. The third access point may utilize this information when transmitting a coordinated beamforming transmission or a joint MIMO transmission that includes the first station as described above.

Some aspects of process 1200 include receiving by the first access point, a second message including a second beamforming report. The second message may be from a second station (e.g., that is connected with the first access point). The second message may be decoded by the first access point to determine sounding information for the second station. The sounding information for the second station may include characterizations of a communications channel between the second station and the second access point. This sounding information may also be transmitted to the second access point. In some aspects, the first and second messages are received as part of a multi-user communication.

In some aspects, process 1200 includes transmitting, by the first access point, a sounding frame. The sounding frame may be a null data frame or packet (NDP) in some aspects. In some aspects, transmission of the sounding frame may be in response to reception of a sounding announce message indicating, for example via a field having a predetermined value, that the first access point is to transmit the sounding frame.

In some aspects, process 1200 includes transmitting, by the first access point, a sounding announce message. The sounding announce message may be configured to indicate, for example, via a field having a predetermined value, that receiving devices addressed or otherwise indicated by the sounding announce message should transmit a sounding message, such as an NDP frame. For example, the sounding announce message may include a cluster identifier or list of devices that are to transmit a sounding frame upon receipt of the sounding announce message. The transmission of the sounding frame may be in response to the sounding announce message.

Some aspects of process 1200 include transmitting, by the first access point a beamforming report trigger frame to the first station. The beamforming report trigger frame is configured to indicate, for example, via one or more fields having one or more corresponding values that devices addressed by the trigger frame (e.g., via a cluster id or list of BSSs, or list of MAC addressees or AIDs) should transmit their respective beamforming report to the first access point. In some aspects, the trigger frame indicates that a station outside the BSS of the first access point is to transmit a beamforming report. This may be indicated via the cluster id or BSSID list as discussed above.

In some aspects, the first access point coordinates the transmission of the sounding frame with one or more other access points, such as the second access point, such that the sounding frame is transmitted simultaneously with transmissions of sounding frames by those other access points. In some aspects, the coordination includes assigning sets of interleaved tones to the first access point and other access points, such that the multiple sounding frames are transmitted simultaneously using interleaved tones. In other aspects, Q-matrix is used to perform the simultaneous transmission of sounding frames by multiple access points.

Another aspect disclosed is a method of sounding a wireless network, comprising: receiving, by a first access point, a first message including a beamforming report for a first station (e.g., connected with the first access point); decoding the beamforming report to determine first station sounding information for a second access point; and transmitting the sounding information to the second access point. The method further comprises decoding the beamforming report to determine first station second sounding information for a third access point; and transmitting the first station second sounding information to the third access point.

In another aspect, the method further comprises receiving a second message including a second beamforming report for a second station (e.g., connected with the first access point); decoding the second beamforming report to determine second station sounding information for the second access point; and transmitting the second station sounding information to the second access point. In another aspect, the method further comprises receiving the first message and the second message as a multi-user uplink transmission.

In another aspect, the method further comprises transmitting a sounding frame. In another aspect, the method further comprises receiving a sounding announce message from the second access point, wherein the transmission of the sounding frame is in response to the sounding announce message. In another aspect, the method further comprises the sounding announce message being a null-data packet (NDP). In another aspect, the method further comprises transmitting a sounding announce message to a second access point, wherein the transmission of the sounding frame is in response to the sounding announce message.

In another aspect, the method further comprises transmitting, by the first access point, a trigger frame to the first station, the trigger frame indicating the first station is to transmit the sounding information. In another aspect, the method further comprises the trigger frame further indicating an OBSS station is to transmit a beamforming report. In another aspect, the sounding frame is transmitted simultaneously with a second sounding frame from a second access point. In another aspect, the method further comprises transmitting the sounding frame with the second sounding frame from the second access point utilizing interleaved tones or a Q-matrix to encoded the two sounding frames.

Another aspect disclosed is an apparatus for sounding a wireless network, comprising: an electronic hardware processor; an electronic hardware memory, operably connected to the electronic hardware processor, and storing instructions that when executed by the electronic hardware processor, cause the electronic hardware processor to: receive, by a first access point, a first message including a beamforming report for a first station (e.g., connected with the first access point); decode the beamforming report to determine first station sounding information for a second access point; and transmit the sounding information to the second access point. In an aspect, the apparatus is further configured to decode the beamforming report to determine first station second sounding information for a third access point; and transmit the first station second sounding information to the third access point.

In an aspect, the apparatus is further configured to receive a second message including a second beamforming report for a second station (e.g., connected with the first access point); decode the second beamforming report to determine second station sounding information for the second access point; and transmit the second station sounding information to the second access point. In an aspect, the apparatus is further configured to receive the first message and the second message as a multi-user uplink transmission. In an aspect, the apparatus is further configured to transmit a sounding frame.

In an aspect, the apparatus is further configured to receive a sounding announce message from the second access point, wherein the transmission of the sounding frame is in response to the sounding announce message. In an aspect, the sounding announce message is a null-data packet (NDP). In an aspect, the apparatus is further configured to transmit a sounding announce message to a second access point, wherein the transmission of the sounding frame is in response to the sounding announce message. In an aspect, the apparatus is further configured to transmit, by the first access point, a trigger frame to the first station, the trigger frame indicating the first station is to transmit the sounding information. In an aspect, the trigger frame further indicates an OBSS station is to transmit a beamforming report. In an aspect, the sounding frame is transmitted simultaneously with a second sounding frame from a second access point. In an aspect, the apparatus is further configured to transmit the sounding frame with the second sounding frame from the second access point utilizing interleaved tones or a Q-matrix to encoded the two sounding frames.

Another aspect disclosed is a non-transitory computer readable storage medium comprising instructions that when executed cause an electronic hardware processor to perform a method of sounding a wireless network, comprising: receiving, by a first access point, a first message including a beamforming report for a first station (e.g., connected with the first access point); decoding the beamforming report to determine first station sounding information for a second access point; and transmitting the sounding information to the second access point. In another aspect, the method performed by the non-transitory computer readable medium further comprises decoding the beamforming report to determine first station second sounding information for a third access point; and transmitting the first station second sounding information to the third access point.

In another aspect, the method performed by the non-transitory computer readable medium further comprises receiving a second message including a second beamforming report for a second station (e.g., connected with the first access point); decoding the second beamforming report to determine second station sounding information for the second access point; and transmitting the second station sounding information to the second access point. In another aspect, the method performed by the non-transitory computer readable medium further comprises receiving the first message and the second message as a multi-user uplink transmission. In another aspect, the method performed by the non-transitory computer readable medium further comprises transmitting a sounding frame.

In another aspect, the method performed by the non-transitory computer readable medium further comprises receiving a sounding announce message from the second access point, wherein the transmission of the sounding frame is in response to the sounding announce message. In another aspect, the sounding announce message is a null-data packet (NDP). In another aspect, the method performed by the non-transitory computer readable medium further comprises transmitting a sounding announce message to a second access point, wherein the transmission of the sounding frame is in response to the sounding announce message. In another aspect, the method performed by the non-transitory computer readable medium further comprises transmitting, by the first access point, a trigger frame to the first station, the trigger frame indicating the first station is to transmit the sounding information. In an aspect, the trigger frame further indicates an OBSS station is to transmit a beamforming report. In an aspect, the sounding frame is transmitted simultaneously with a second sounding frame from a second access point. In another aspect, the method performed by the non-transitory computer readable medium further comprises transmitting the sounding frame with the second sounding frame from the second access point utilizing interleaved tones or a Q-matrix to encoded the two sounding frames.

Figure 13:
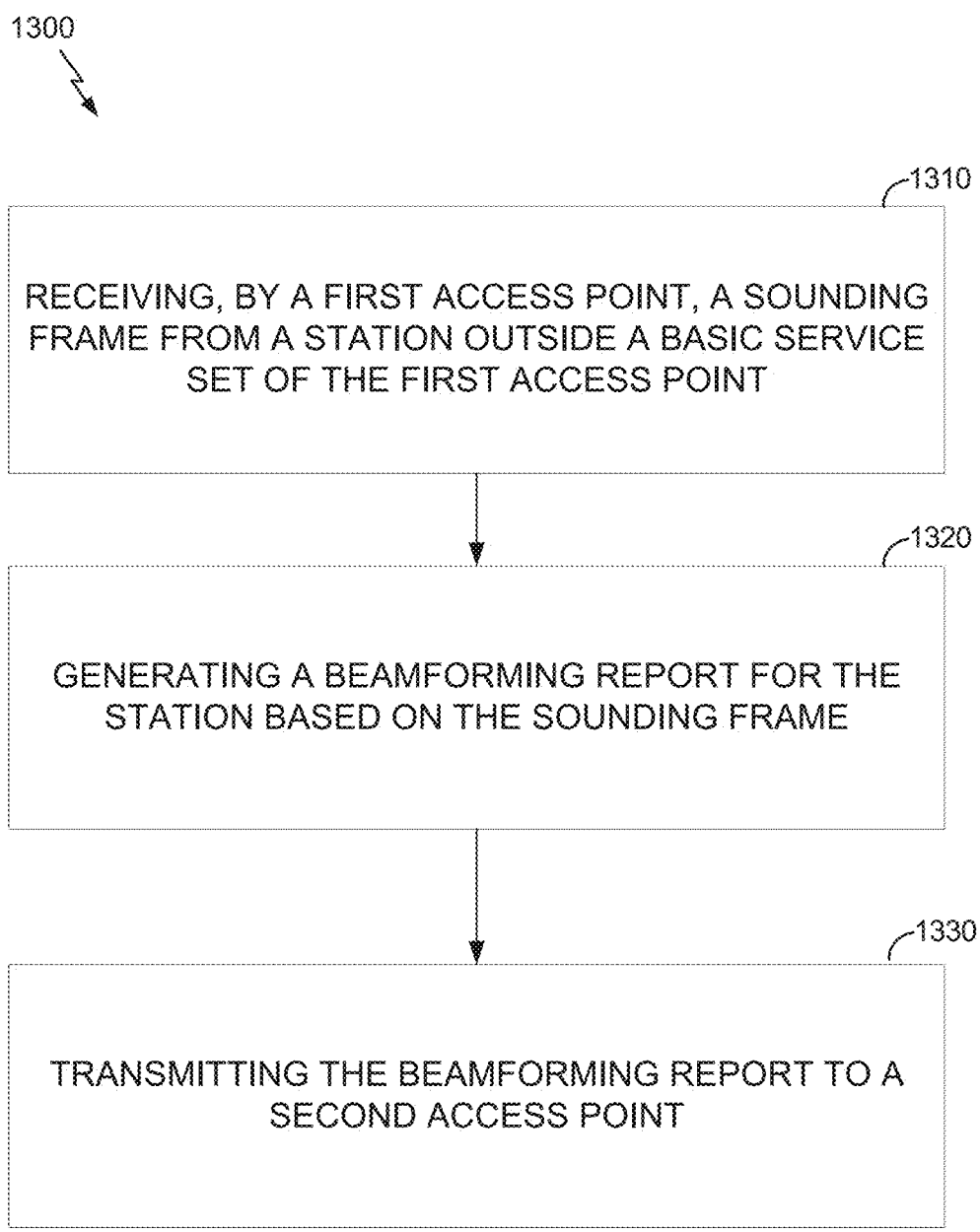
FIG. 13 is a flowchart for an exemplary method of sounding a wireless network.

FIG. 13 is a flowchart for an exemplary method of sounding a wireless network. In some aspects, the process 1300 discussed below with respect to FIG. 13 may be performed by the device 202. For example, in some aspects, instructions stored in the memory 206 may configure the hardware processor 204 to perform one or more of the functions discussed below with respect to FIG. 13.

The process 1300 discussed below with respect to FIG. 13 provides for the gathering of information on a communication path between an access point and one or more stations that may not be connected to (and/or "communicating with") the station. In other words, the access point and stations may be in different basic service sets. The information on the communication path may include one or more of channel coefficients, path loss information, and RSSI indications, along with possibly other information that can assist a transmitting device in determining how best to transmit a signal over the communication path to the destination device to provide for an enhanced quality of the signal when received by the device.

Information on the communication path between unassociated devices, as described above, may be utilized when performing one or more of the joint MIMO communications, utilizing multiple BSSs for transmission over a single channel simultaneously. Since signals from the multiple BSSs interference with each other, the information on the communication paths can enable transmitting devices within the multiple BSSs to tailor their transmission signals to reduce this interference in some situations. The information on the communication paths may also be utilized for coordinated beamforming transmissions. Such transmissions may include transmission of a signal nulling interference being caused by a second signal that is also being transmitted simultaneously. The nulling signal may reduce interference at a device caused by the second signal.

In some aspects, process 1300 allows an access point to compute sounding statistics for one or more stations within its BSS. In some aspects, the access point computes sounding statistics for only stations within its BSS that can be characterized as non-reuse STAs. This information may then be transmitted to other access points, which may utilize the information, in at least some aspects, to negate interference they create for those non-reuse STAs.

In block 1310, a sounding frame is received by a first access point. The sounding frame is received from a first station that is not associated with the first access point. In other words, the first station is an OBSS station relative to the first access point.

In block 1320, a beamforming report is generated for the station by the first access point based on the sounding frame. The beamforming report may include sounding information relating to a communication path between the OBSS station and the first access point. For example, upon receiving the sounding frame, the access point may determine one or more of channel coefficients, path loss, and/or RSSI information relating to a channel used to transmit/receive the sounding frame. This information may be included in the beamforming report.

In block 1330, the beamforming report is transmitted to a second access point.

In some aspects of process 1300, the first access point and second access point coordinate to determine a sounding time. In some aspects, this coordination comprises an exchange of messages between at least the two access points that result in the two access points jointly defining the sounding time. The first access point may then prepare to receive the sounding frame from the OBSS station based on the sounding time. For example, the first access point may configure receive filters such that a message received from an OBSS station is not dropped by receiver hardware or a lower layer of software within the device and is instead allowed to be processed by additional hardware/software functions of the device such that the sounding information may be determined.

Some aspects of process 1300 include transmitting a trigger frame to one or more stations (e.g., connected with the first access point) based on the sounding time. The trigger frame may indicate, for example, via one or more fields having one or more predetermined values, that stations addressed by the trigger frame are to transmit a sounding frame. The stations may be addressed by the trigger in any of the manners discussed above, for example, by inclusion of the first access points BSSID in the trigger, frame. One or more APs (other than the first access point) may compute sounding statistics based on the sounding frame(s) resulting from the trigger frame. These APs may use the statistics when performing a coordinated beamforming transmission or joint MIMO transmission that includes the one or more stations (e.g., connected with the first access points).

Another aspect disclosed is a method of sounding a wireless network, comprising: receiving, by an access point having a basic service set, a sounding frame from a station outside the basic service set; generating a beamforming report for the station based on the sounding frame; transmitting the beamforming report to a second access point. In an aspect, the method further comprises negotiating with the second access point to determine a sounding time; and receiving the sounding frame in response to the sounding time. In an aspect, the method further comprises transmitting a trigger to a station (e.g., connected with the access point) based on the sounding time, the trigger message indicating the station is to transmit a sounding frame.

Another aspect disclosed is an apparatus for sounding a wireless network, comprising: an electronic hardware processor; an electronic hardware memory, operably connected to the electronic hardware processor, and storing instructions that when executed by the electronic hardware processor, cause the electronic hardware processor to: receive, by an access point having a basic service set, a sounding frame from a station outside the basic service set; generate a beamforming report for the station based on the sounding frame; transmit the beamforming report to a second access point. In an aspect, the electronic hardware memory stores further instructions that configure the electronic hardware processor to: negotiate with the second access point to determine a sounding time; and receive the sounding frame in response to the sounding time. In an aspect, the electronic hardware memory stores further instructions that configure the electronic hardware processor to transmit a trigger to a station (e.g., connected with the access point) based on the sounding time, the trigger message indicating the station is to transmit a sounding frame.

Another aspect disclosed is a non-transitory computer readable storage medium comprising instructions that when executed cause an electronic hardware processor to perform a method of sounding a wireless network, the method comprising: receiving, by an access point having a basic service set, a sounding frame from a station outside the basic service set; generating a beamforming report for the station based on the sounding frame; transmitting the beamforming report to a second access point. In an aspect, the method further comprises negotiating with the second access point to determine a sounding time; and receiving the sounding frame in response to the sounding time. In an aspect, the method further comprises transmitting a trigger to a station (e.g., connected with the access point) based on the sounding time, the trigger message indicating the station is to transmit a sounding frame.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. In some aspects, the means for receiving may comprise one or more of the receiver 212, the transceiver 214, the DSP 220, the processor 204, the memory 206, the signal detector 218, the cellular modem 234, the WLAN modem 238, or equivalents thereof. In some aspects, means for transmitting may comprise one or more of the transmitter 210, the transceiver 214, the DSP 220, the processor 204, the memory 206, the cellular modem 234, the WLAN model 238, or equivalents thereof. In some aspects, the means for determining, means for utilizing, means for excluding, means for signaling, means for initiating, means for initiating, means for measuring, means for separately determining, means for adjusting, means for deriving, means for combining, or means for evaluating may comprise one or more of the DSP 220, the processor 204, the memory 206, the user interface 222, the cellular modem 234, the WLAN modem 238, or equivalents thereof.

Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of sounding a wireless network associated with multiple basic service sets (BSSs), the method performed by a first access point corresponding to a first BSS and comprising:
    receiving, from a first wireless device unassociated with the first access point, a first message including first beamforming information indicative of channel conditions between the first wireless device and the first access point and indicative of channel conditions between the first wireless device and a second access point corresponding to a second BSS;
    determining first sounding information for a first communication path between the first wireless device and the first access point based on the first beamforming information;
    determining second sounding information for a second communication path between the first wireless device and the second access point based on the first beamforming information; and
    transmitting a second message, based on the first beamforming information, to the first wireless device, wherein the second message includes one or both of the first sounding information and the second sounding information.

2. The method of claim 1, further comprising:
    forming a cluster that includes the first access point and the second access point; and
    assigning a cluster identifier to the cluster.

3. The method of claim 2, further comprising:
communicating with a second wireless device associated with the second access point based in part on the cluster identifier; and
transmitting, to at least the second wireless device, a sounding announce message that includes the cluster identifier.

4. The method of claim 3, further comprising:
transmitting, to at least the second wireless device, a sounding frame that includes at least one of the cluster identifier and a set of BSS identifiers for access points included in the cluster.

5. The method of claim 4, wherein the method further comprises:
transmitting, to a third wireless device, a third message that includes the set of BSS identifiers.

6. The method of claim 4, wherein the sounding announce message includes the set of BSS identifiers.

7. The method of claim 1, further comprising receiving a multi-user uplink transmission that includes the first beamforming information provided by the first wireless device and includes second beamforming information provided by a second wireless device outside the first BSS.

8. The method of claim 1, further comprising:
transmitting a sounding frame; and
transmitting a trigger frame that includes a request for transmission of the first beamforming information from the first wireless device.

9. The method of claim 8, further comprising:
forming a cluster that includes the first access point and the second access point; and
assigning a cluster identifier to the cluster, wherein the trigger frame includes the cluster identifier.

10. The method of claim 8, further comprising:
communicating with the second access point to determine a BSS identifier of the second access point, wherein the trigger frame includes a set of BSS identifiers for the first access point and the second access point.

11. The method of claim 1, further comprising decoding a user info field included in the first message to determine a media access control (MAC) address of the first wireless device.

12. The method of claim 11, further comprising:
decoding a second user info field included in the first message to determine a second MAC address of a second wireless device;
generating a third message to include an identifier of the first access point; and
communicating with the second wireless device based on the identifier.

13. An apparatus for sounding a wireless network associated with multiple basic service sets (BSSs), the apparatus corresponding to a first BSS and comprising:
one or more processors;
a memory storing instructions that, when executed by the one or more processors, cause the apparatus to:
receive, from a first wireless device unassociated with the apparatus, a first message including first beamforming information indicative of channel conditions between the first wireless device and the apparatus and indicative of channel conditions between the first wireless device and a second access point corresponding to a second BSS;
determine first sounding information for a first communication path between the first wireless device and the apparatus based on the first beamforming information;
determine second sounding information for a second communication path between the first wireless device and the second access point based on the first beamforming information; and
transmit a second message, based on the first beamforming information, to the first wireless device, wherein the second message includes one or both of the first sounding information and the second sounding information.

14. The apparatus of claim 13, wherein execution of the instructions further causes the apparatus to:
form a cluster that includes the apparatus and the second access point; and
assign a cluster identifier to the cluster.

15. A method of sounding a wireless network by a first wireless device, comprising:
receiving a first sounding message from a first access point;
determining first beamforming information indicative of channel conditions between the first wireless device and the first access point based on the first sounding message;
transmitting, to the first access point, a first message including the first beamforming information;
receiving a trigger frame from a second access point;
determining that the trigger frame includes an indication of the second access point and also includes an identifier of the first wireless device; and
transmitting the first beamforming information to the second access point based on the indication and the identifier.

16. The method of claim 15, further comprising:
decoding, from the first sounding message, one or more parameters including a cluster identifier, a list of basic service set (BSS) identifiers, and a transmitter address; and
determining whether to generate the first message based on comparing the one or more parameters to information received during communication with the second access point.

17. The method of claim 15, further comprising:
receiving, from the first access point, a sounding announce message including an indication for the first wireless device to listen for the first sounding message.

18. The method of claim 15, further comprising:
receiving a second sounding message from a third access point unassociated with the first wireless device; and
generating the first message further based on the second sounding message.

19. The method of claim 18, wherein the first wireless device receives the first and second sounding messages via:
a distributed multiple-input and multiple-output (MIMO) communication from the first access point and the third access point, and
a set of interleaved tones or a Q-matrix encoding.

20. The method of claim 18, wherein the first wireless device receives the first sounding message a short interframe space (SIFS) time after receiving the second sounding message.

21. The method of claim 15, further comprising:
receiving, from the first access point, a trigger frame soliciting the first beamforming information;
determining that the trigger frame includes an indication of the first access point; and
transmitting the first message to the first access point based on the indication included in the trigger frame.

22. The method of claim 15, wherein the identifier comprises one or more of a cluster identifier, a media access control (MAC) address, and a list of basic service set identifiers from the trigger frame.

23. The method of claim 15, further comprising transmitting the first message as part of a joint uplink multi-user communication.

24. An apparatus for sounding a wireless network, comprising: one or more processors;
a memory storing instructions that, when executed by the one or more processors, cause the apparatus to:
receive a first sounding message from a first access point;
determine first beamforming information indicative of channel conditions between the apparatus and the first access point based on the first sounding message;
transmit, to the first access point, a first message including the first beamforming information;
receive a trigger frame from a second access point;
determine that the trigger frame includes an indication of the second access point and also includes an identifier of the apparatus; and
transmit the first beamforming information to the second access point based on the indication and the identifier.

25. The apparatus of claim 24, wherein execution of the instructions further causes the apparatus to:
decode, from the first sounding message, one or more parameters including a cluster identifier, a list of basic service set identifiers, and a transmitter address; and
determine whether to generate the first message based on comparing the one or more parameters to information received during communication with a second access point.

26. The apparatus of claim 24, wherein execution of the instructions further causes the apparatus to:
receive, from the first access point, a sounding announce message including an indication for the apparatus to listen for the first sounding message.

27. The apparatus of claim 24, wherein execution of the instructions further causes the apparatus to:
receive a second sounding message from a third access point unassociated with the apparatus; and
generate the first message further based on the second sounding message.

28. The apparatus of claim 27, wherein execution of the instructions causes the apparatus to receive the first and second sounding messages via:
a distributed multiple-input and multiple-output (MIMO) communication from the first access point and the third access point, and
a set of interleaved tones or a Q-matrix encoding.

* * * * *